United States Patent
Dodd et al.

(10) Patent No.: US 7,118,828 B2
(45) Date of Patent: Oct. 10, 2006

(54) IMPLANTABLE BATTERY

(75) Inventors: Joanna Dodd, Burbank, CA (US);
Joseph Wong, Glendale, CA (US);
David M. Skinlo, Valencia, CA (US);
Clay Kishiyama, Burbank, CA (US);
Hisashi Tsukamoto, Saugus, CA (US)

(73) Assignee: Quallion LLC, Sylmar, CA (US)

( * ) Notice: Subject to any disclaimer, the term of this patent is extended or adjusted under 35 U.S.C. 154(b) by 519 days.

(21) Appl. No.: 10/342,850

(22) Filed: Jan. 14, 2003

(65) Prior Publication Data

US 2003/0171784 A1    Sep. 11, 2003

Related U.S. Application Data

(60) Provisional application No. 60/363,455, filed on Mar. 11, 2002.

(51) Int. Cl.
- H01M 2/26    (2006.01)
- H01M 4/00    (2006.01)
- H01M 2/14    (2006.01)
- H01M 2/18    (2006.01)
- H01M 2/16    (2006.01)

(52) U.S. Cl. .................. 429/161; 429/128; 429/129; 429/130; 429/246

(58) Field of Classification Search ............... 429/128, 429/161, 211, 246, 129, 130
See application file for complete search history.

(56) References Cited

U.S. PATENT DOCUMENTS

| | | | |
|---|---|---|---|
| 3,094,438 A | 6/1963 | Daley et al. | 429/161 |
| 3,488,220 A | 1/1970 | Lyall et al. | 429/59 |
| 3,785,867 A | 1/1974 | Edwards et al. | 136/6 R |
| 3,841,914 A | 10/1974 | Boyle et al. | 136/111 |
| 4,049,888 A | 9/1977 | Flender | 429/115 |
| 4,215,187 A | 7/1980 | Gnida et al. | 429/161 |
| 4,248,944 A | 2/1981 | Smilanich | 429/185 |
| 4,287,273 A | 9/1981 | Harney et al. | 429/153 |
| 4,420,545 A | 12/1983 | Meyer et al. | 429/101 |
| 4,668,320 A | 5/1987 | Crabtree | 156/192 |
| 4,671,447 A | 6/1987 | Klink | 228/50 |

(Continued)

FOREIGN PATENT DOCUMENTS

DE    10247674 A1    10/2002

(Continued)

OTHER PUBLICATIONS

Advanced Coating Parylene Conformal Coating Specialists, Technical Info re Description of Parylene, 2 pages, May 2002, http://www.advancedcoating.com/tech1.html.

*Primary Examiner*—Patrick Joseph Ryan
*Assistant Examiner*—Thomas H. Parsons
(74) *Attorney, Agent, or Firm*—Gavrilovich, Dodd & Lindsey LLP

(57) ABSTRACT

The present invention discloses a device and method pertaining to battery construction. In the preferred embodiment, the shape and construction of the battery is designed to maximize energy density and efficiency, while minimizing volume and related restrictions. Furthermore, the efficient, simplified internal construction of the present invention, using readily available tubes, pins and spacers, renders it safe and reliable for medical applications, and lends to relative ease and cost effectiveness in manufacturing. The utilization of a neutral case further adds to the safety and reliability of the present invention. Also, the strategic positioning of the electrolyte fill hole allows for quick filling. A related battery construction tool and method are also disclosed adding to the overall usefulness and efficiency of the present invention.

59 Claims, 20 Drawing Sheets

U.S. PATENT DOCUMENTS

| | | |
|---|---|---|
| 4,940,858 A | 7/1990 | Taylor et al. .......... 174/152 GM |
| 5,047,301 A | 9/1991 | Adlhart et al. ............... 429/101 |
| 5,227,267 A | 7/1993 | Goebel et al. ............... 429/161 |
| 5,254,415 A | 10/1993 | Williams et al. ............ 429/153 |
| 5,288,566 A | 2/1994 | Ginatta et al. ............... 429/210 |
| 5,314,544 A | 5/1994 | Oweis ............................ 134/5 |
| 5,397,661 A | 3/1995 | Kaun .......................... 429/181 |
| 5,484,666 A | 1/1996 | Gibb et al. .................... 429/34 |
| 5,522,851 A | 6/1996 | Fayram |
| 5,605,771 A | 2/1997 | Eidler et al. ................... 429/72 |
| 5,731,102 A | 3/1998 | Monahan .................... 429/112 |
| 5,811,206 A | 9/1998 | Sunderland et al. ......... 429/181 |
| 5,814,082 A | 9/1998 | Fayram et al. ................. 607/5 |
| 5,919,274 A | 7/1999 | Tuttle ........................ 29/623.2 |
| 5,925,481 A | 7/1999 | Monahan .................... 429/112 |
| 6,040,082 A | 3/2000 | Haas et al. .................. 429/163 |
| 6,137,673 A | 10/2000 | Andou et al. ............... 361/502 |
| 6,139,987 A | 10/2000 | Koo et al. ................... 429/210 |
| 6,141,205 A | 10/2000 | Nutzman et al. ........... 361/509 |
| 6,150,052 A | 11/2000 | Urry .......................... 429/128 |
| 6,294,288 B1 | 9/2001 | Gross .......................... 429/153 |
| 6,436,155 B1 | 8/2002 | Gross ........................ 29/623.1 |
| 6,531,247 B1 | 3/2003 | Yang .......................... 429/211 |
| 2001/0041288 A1 | 11/2001 | Onishi et al. |
| 2002/0028377 A1 | 3/2002 | Gross |
| 2002/0028384 A1 | 3/2002 | Krasnov et al. |
| 2002/0064708 A1 | 5/2002 | Asahina et al. |
| 2002/0071989 A1 | 6/2002 | Verma et al. |
| 2003/0017390 A1 | 1/2003 | Probst et al. |

FOREIGN PATENT DOCUMENTS

| | | |
|---|---|---|
| EP | 0715867 A2 | 6/1996 |
| EP | 0715867 A3 | 2/1998 |
| EP | 1407801 A2 | 10/2003 |
| JP | 61-093562 A2 | 5/1986 |
| JP | 63-298961 A2 | 12/1988 |
| JP | 2037666 A2 | 2/1990 |
| JP | 2003-077524 | 3/2003 |
| WO | WO 00/04601 A1 | 1/2000 |
| WO | WO 00/35033 A1 | 6/2000 |
| WO | WO 01/65624 A1 | 9/2001 |

IMPLANTABLE BATTERY

REFERENCE TO PRIOR FILED APPLICATIONS

This application claims the benefit of U.S. Provisional Application 60/363,455 filed Mar. 11, 2002.

TECHNICAL FIELD

This invention relates to a battery and more particularly to a reliable implantable battery having a configuration that maximizes the ratio of active material to internal volume.

BACKGROUND

Implantable medical devices such as pacemakers, defibrillators, speech processors, left ventricular assist devices (LVAD), and neurostimulators are becoming more and more common and have many unique requirements. Small, round, lightweight devices having flat shapes are desirable for ease of implant and patient comfort. Additionally, these devices have strict safety and reliability requirements.

In many of these devices, the batteries make up the majority of the weight and volume. Therefore, batteries are needed of a specific shape to make the best use of the space available in each device. For many of these devices, the batteries themselves should be small, flat, and lightweight.

One method of producing flat cells is by using a stacked plate design. As shown in FIG. 1, a typical battery stack 10 is constructed such that the positive electrodes 11 have tabs 12 that extend past the edges of the negative electrodes 13 and serve as the current collectors. The positive tabs 12 are collected and connected by a weld or other attachment 14 (shown schematically). Likewise, the negative electrodes 13 have tabs 15 that extend past the edges of the positive electrodes 11 and are collected and connected by a weld or other attachment 16 (shown schematically). The tab design is simple and advantageously has only a small number of cell components. However, the tabs must be of sufficient length to reach each other to connect all the tabs and to insulate and isolate the tabs of the opposite polarity. Using tabs wastes internal volume, or headspace, around the tabs causing the battery volume to be larger or the battery capacity to be smaller than if tabs were not used. Furthermore, because the number of tabs that can be connected together in a weld or electromechanical joint is limited, this construction limits the number of electrodes capable of being stacked together. Overall, using tabs reduces the energy density of the cell. With the search for smaller and smaller packages, especially in medical applications, designers are pressed to fit more into less space, which is a difficult task with the tab design.

For stacked plate design batteries, one of the most important design requirements to ensure performance and safety is maintenance of electrode alignment. Proper alignment of the electrodes and separators must include an adequate safety margin for initial assembly and must be maintained for safe operation over the life of the cell. This is especially important for implantable cells because of the effects that a failure may have on the device performance and ultimately on the patient. For tab designs in which all of the terminations are made through a single common point, maintaining proper alignment can be difficult. Cell elements unintentionally may be allowed to rotate, leading to safety concerns such as short circuits or Li plating. While alignment is improved with multi-tab designs, headspace remains an issue, with the multiple tabs taking up significant space in the cell.

Another drawback of the typical tab design is that as the electrode layers are cut, the cutting process tends to produce burrs at the corners, particularly at inside corners such as area 17. These burrs can cause short circuits.

Another method of producing flat profile cells is by using a folded-type cell design. In these designs each electrode is layered together in an alternating fold with a separator being combined during each consecutive fold. Each panel of the electrode is connected with a small jumper ribbon of material and serves as the current collector of the entire combination of electrodes. This design is well proven in cell phone applications and has potential for inexpensive construction and manufacture. However, this geometry has size constraints and still has the problem of maintaining alignment of the components during manufacture and usage. The ribbons protrude in a similar manner as the tabs described above, thereby wasting precious space. Because the folded designs do not incorporate alignment features, the relative sizes of the electrodes are used to ensure the safety of the device. The negative electrodes are sized larger than the positive such that under its greatest misalignment, the positive is still covered by the negative. This makes the folded-type battery less space efficient.

In U.S. Pat. No. 6,139,987 to Koo et al., a bipolar battery uses an anode pin and a cathode pin to mount electrodes and contact rings, with anode contact rings fitted into cutouts of the cathode and vice versa, thus obviating the use of tabs. However, it is not clear how the electrodes are actually aligned and electrically and mechanically coupled; proper alignment and coupling are critical to the operation of the battery. Furthermore, the battery is filled with electrolyte through a center hole called an electrolyte injection hole; the electrolyte must flow into the hole and through smaller ports in the injection ring to contact and saturate the electrodes. Moreover, there is no mention of terminals and it is unclear what structures would function as terminals.

It is therefore desirable to provide a reliable flat battery having a configuration that eliminates the use of tabs for construction while overcoming other limitations of the prior art.

It is also desirable to provide a configuration that can be made into custom shapes for applications that are space-limited, such as implantable medical devices and satellites and other aerospace devices.

It is further desirable to provide a safe, compact, space-efficient, high capacity battery.

SUMMARY

The battery of an embodiment of the present invention uses spacers, preferably in the form of washers on tubes, to connect the electrodes together at exposed areas on the electrode substrate. By having the attachment point interior to the main perimeter of the electrode, this invention maximizes the ratio of active electrode material to internal volume. The electrodes are captured by spacers and are not directly connected to each other. By welding the spacers and substrates together, the electrodes are electrically and mechanically connected. The thicknesses of the spacers are designed to match the thicknesses of the electrodes so that the substrates are not deformed or bent. The substrates maintain a substantially planar form and maintain their spacing from each other. Using this electrode and spacer design, the battery is not constrained by the number of electrodes or by a tab length. The battery may incorporate any number of electrodes and spacers by extending the tube and mounting additional pairs of electrodes and spacers.

Furthermore, the battery of an embodiment of the present invention uses an effective three-pin design to maintain alignment of the electrodes and separator layers.

Because of the unique construction of the electrode assembly, the shape of the battery may be optimized for each implantable device.

The battery of an embodiment of the present invention has a neutral case for safety.

DETAILED DESCRIPTION

The following text describes the preferred mode presently contemplated for carrying out the invention and is not intended to describe all possible modifications and variations consistent with the spirit and purpose of the invention. The scope of the invention should be determined with reference to the claims. As used herein, a "battery" may be a single cell or a series of cells.

Shape

Figure 1:
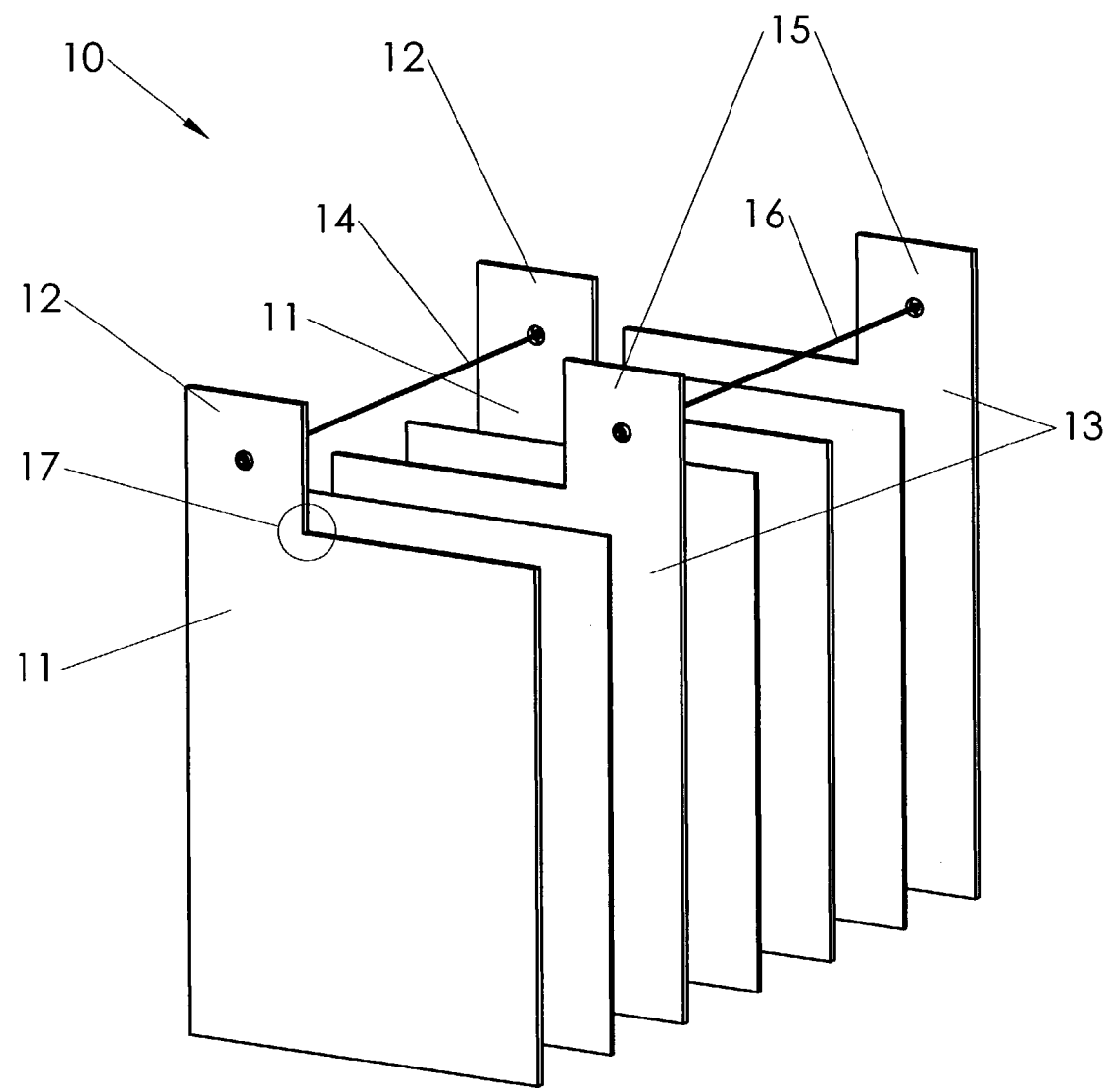
FIG. 1 is a plan view of a typical stacked battery of the prior art.
Figure 2:
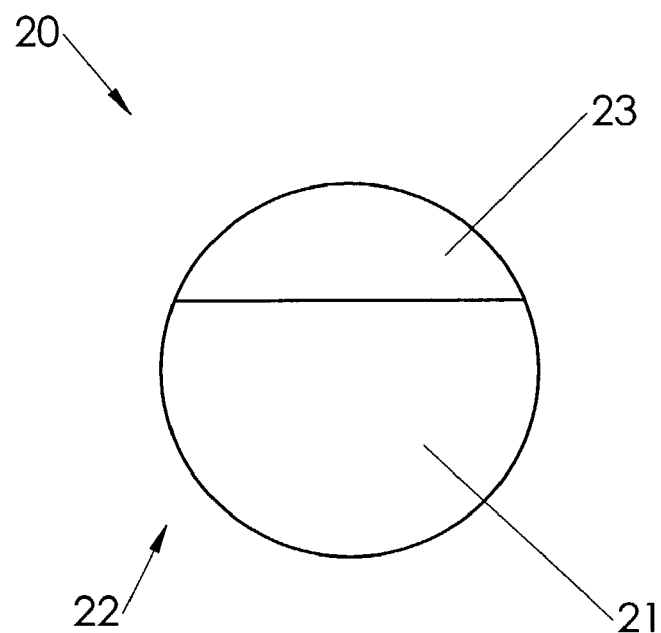
FIGS. 2–3 are plan views of devices having batteries of the prior art.
Figure 3:
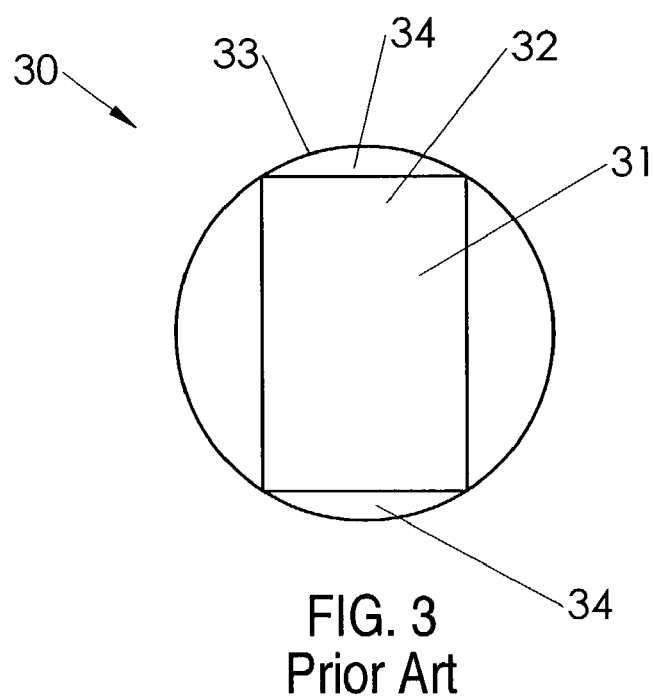
Figure 4:
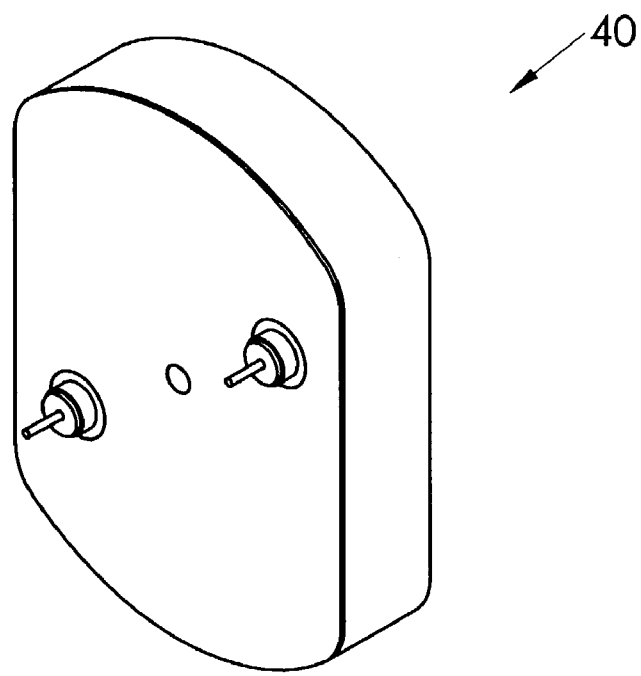
FIG. 4 is a plan view of the battery of an embodiment of the present invention.
Figure 5:
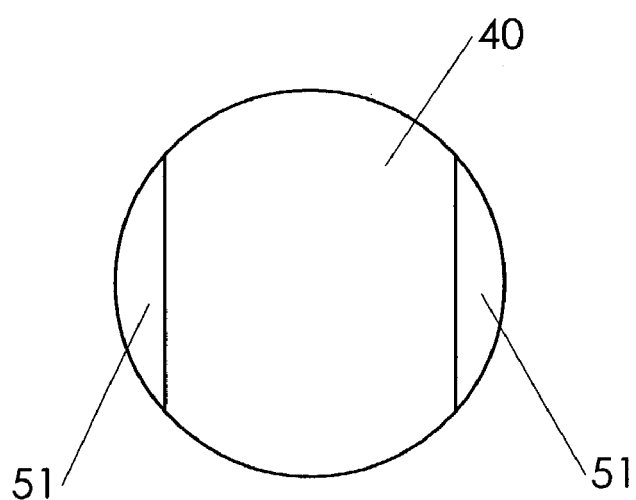
FIGS. 5–7 are plan views of three different devices having batteries of various embodiments of the present invention.
Figure 6:
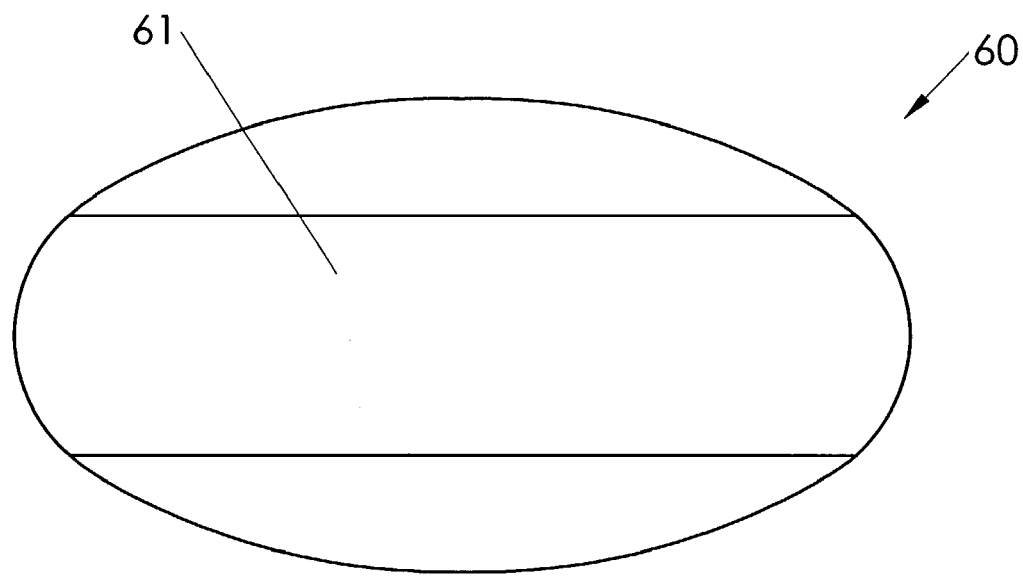
Figure 7:
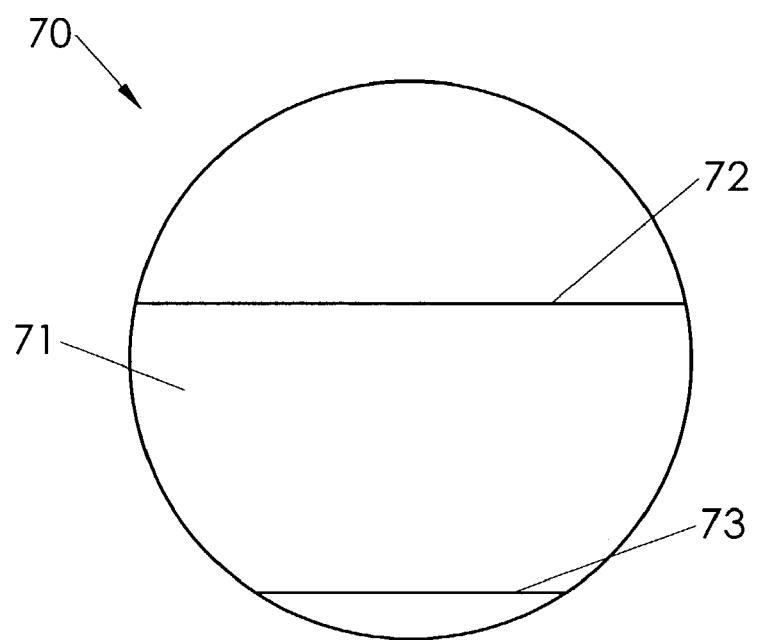

Prior art batteries typically have some drawbacks when used in circular or ovoid devices. As shown in FIG. 2, a cardiac pacemaker 20 is generally circular or ovoid, and its battery 21 is often located on only one side of the device, making the battery side 22 heavier than the other side 23 having electronic components often encased in epoxy. While it may be acceptable to have a lopsided weight in some devices, in other devices, this may be undesirable. As shown in FIG. 3, rectangular batteries 31 having all flat edges 32 also have been used in devices 30 having round edges 33, wasting valuable internal volume 34 in the device. The battery of the present invention is not limited in shape, and we have found that a battery shape shown in FIGS. 4 and 5 provides weight symmetry, allows components 51 to be placed on either side of the battery 40, and maximizes the energy density by using otherwise wasted space. Although the scale and aspect ratios are not limited and will vary depending on the application, the dimensions of the battery shown in FIG. 4 may be, for example, approximately 28 mm long×20 mm wide×5.5 mm thick. FIG. 6 shows an alternative embodiment of the shape of the battery 61 of the present invention, wherein the device 60 is ovoid. This shape also provides the benefits of the embodiment of FIG. 4. FIG. 7 shows yet another alternative embodiment of the shape of the battery 71 of the present invention, wherein the two flat sides 72 and 73 are of unequal length and the battery 71 is not centered in the device 70. While this loses some of the weight symmetry provided by the configurations of batteries 40 and 61, it does provide maximization of energy density and allows components to be placed on either side of the battery 71. It also allows a larger space for components on one side of the battery than the other, which may be advantageous for some device designs.

Stacking Method

Figure 8A:
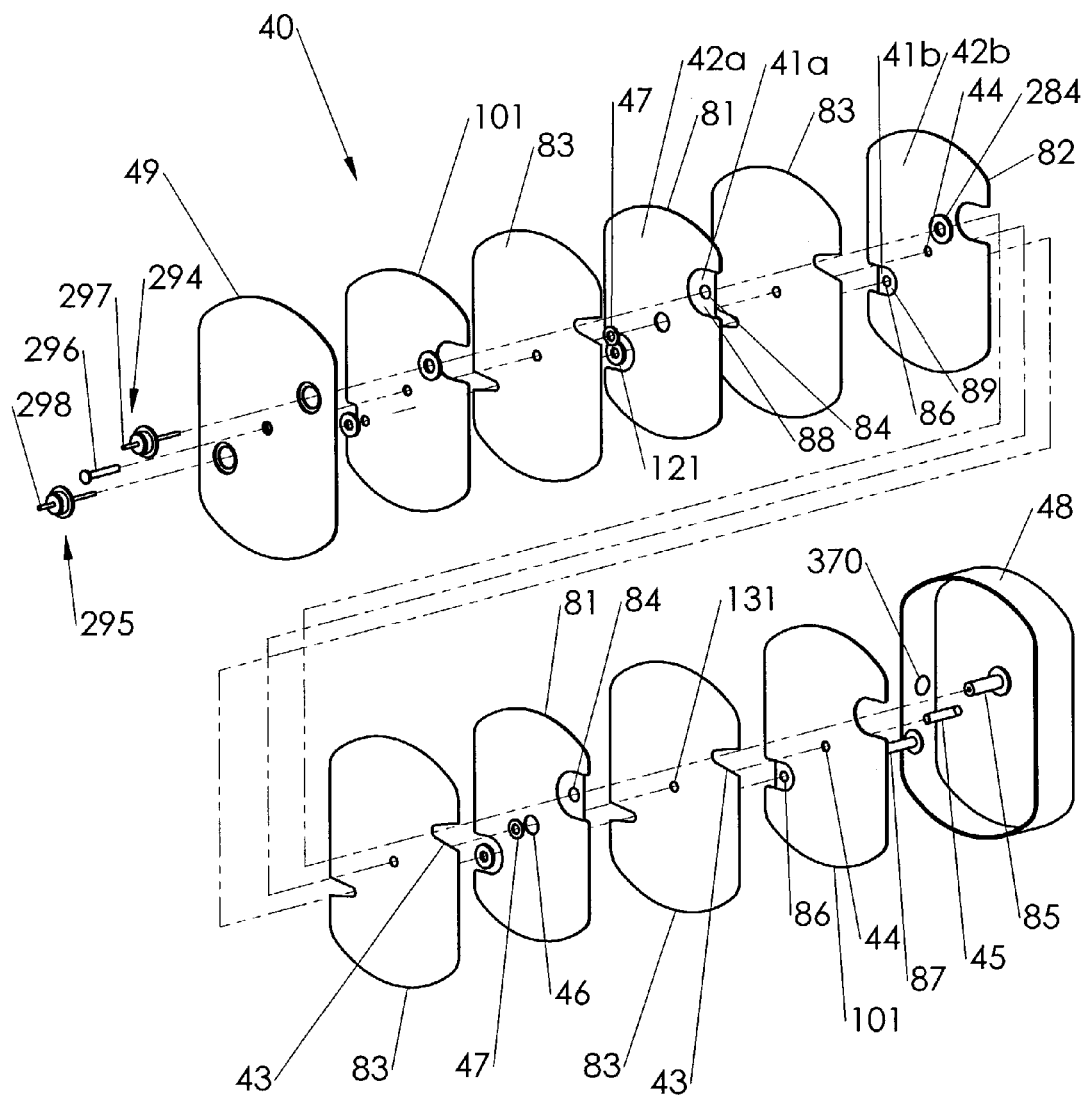
FIG. 8A is an exploded view of the battery of an embodiment of the present invention.
Figure 8B:
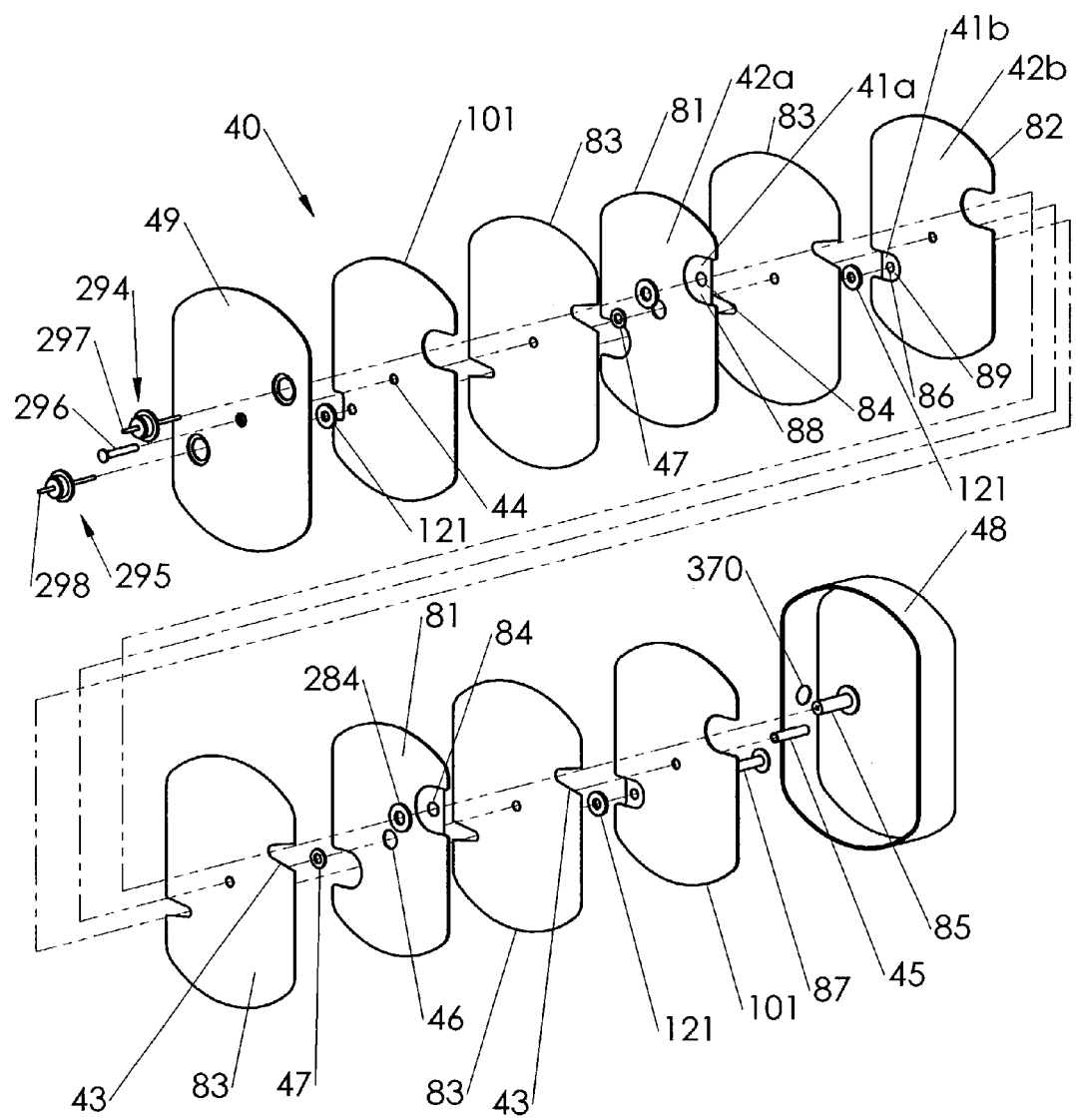
FIG. 8B is an exploded view of alternative embodiment of the battery of an embodiment of the present invention.
Figure 8C:
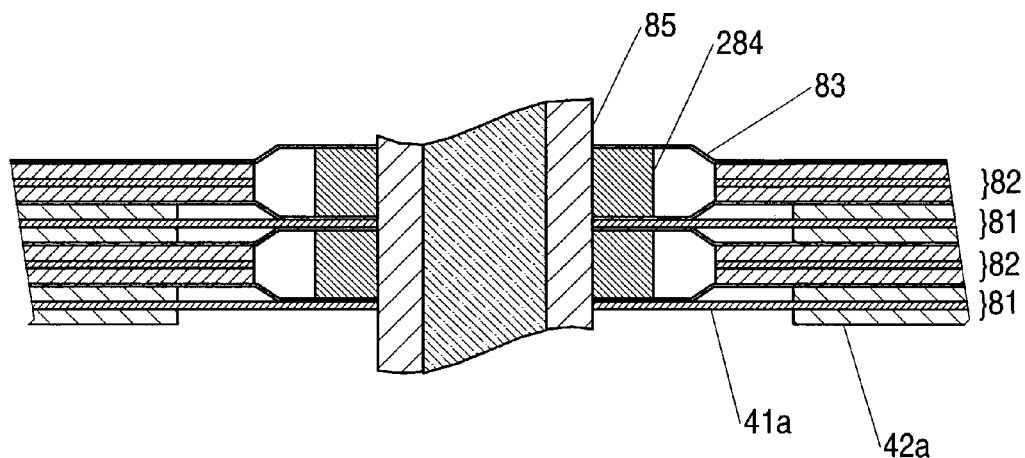
FIGS. 8C and D are side cross sectional views of the positive and negative feedthroughs of the battery of the embodiment of the FIG. 8A.
Figure 8D:
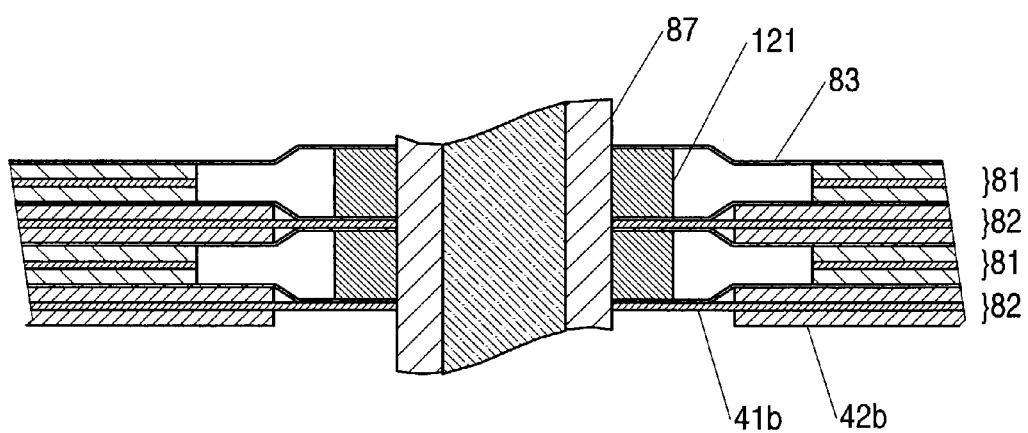
FIGS. 8E and F are side cross sectional views of the positive and negative feedthroughs of the battery of the embodiment of the FIG. 8B.

As shown in FIGS. 8A, 8C, and 8D, the stacked battery 40 in an embodiment of the present invention is formed by multiple layers of positive electrodes 81 and negative electrodes 82, separated by sheets of separator 83, which preferably comprise polyethylene and/or polypropylene. Each positive electrode 81 has a positive hole 84 through which a positive tube 85 slides, and each negative electrode 82 has a negative hole 86 through which a negative tube 87 slides. Electrodes 81 and 82 comprise substrates, 41a and 41b, respectively, coated on both sides with an active material, 42a and 42b, respectively. Substrates 41a and 41b may be die cut, laser cut, or the like. To minimize burrs, preferably, the electrode substrate has no sharp inside or outside corners, only rounded. Each positive electrode 81 has an area 88 around hole 84, and each negative electrode 82 has an area 89 around hole 86; these areas have been cleared of active material 42b and 42b, such as by scraping. The separator 83 has cutouts 43 in which tubes 85 and 87 fit. Each negative electrode 82 has a locator hole 44 in which an insulating tube 45 slides. Insulating tube 45 preferably comprises polyperfluoroalkoxyethylene (PFA), polypropylene, polyimide, or a parylene coated metal. Each positive electrode 81 has a locator hole 46 in which an insulating spacer 47 fits. The insulating spacer 47 has a thickness of about 50 to 150% of the thickness of the positive electrode and more preferably about the thickness of the positive electrode. The insulating spacer 47 is slid over insulating tube 45. The battery stack is housed in a case 48 with a cover 49. The feedthrough pins 297 and 298 of positive terminal 294 and negative terminal 295, respectively, are coupled to the positive and negative electrodes 81 and 82, respectively, as will be described later, and serve as two of three alignment pins in the assembly. Locator pin 296 is the third alignment pin.

Figure 9:
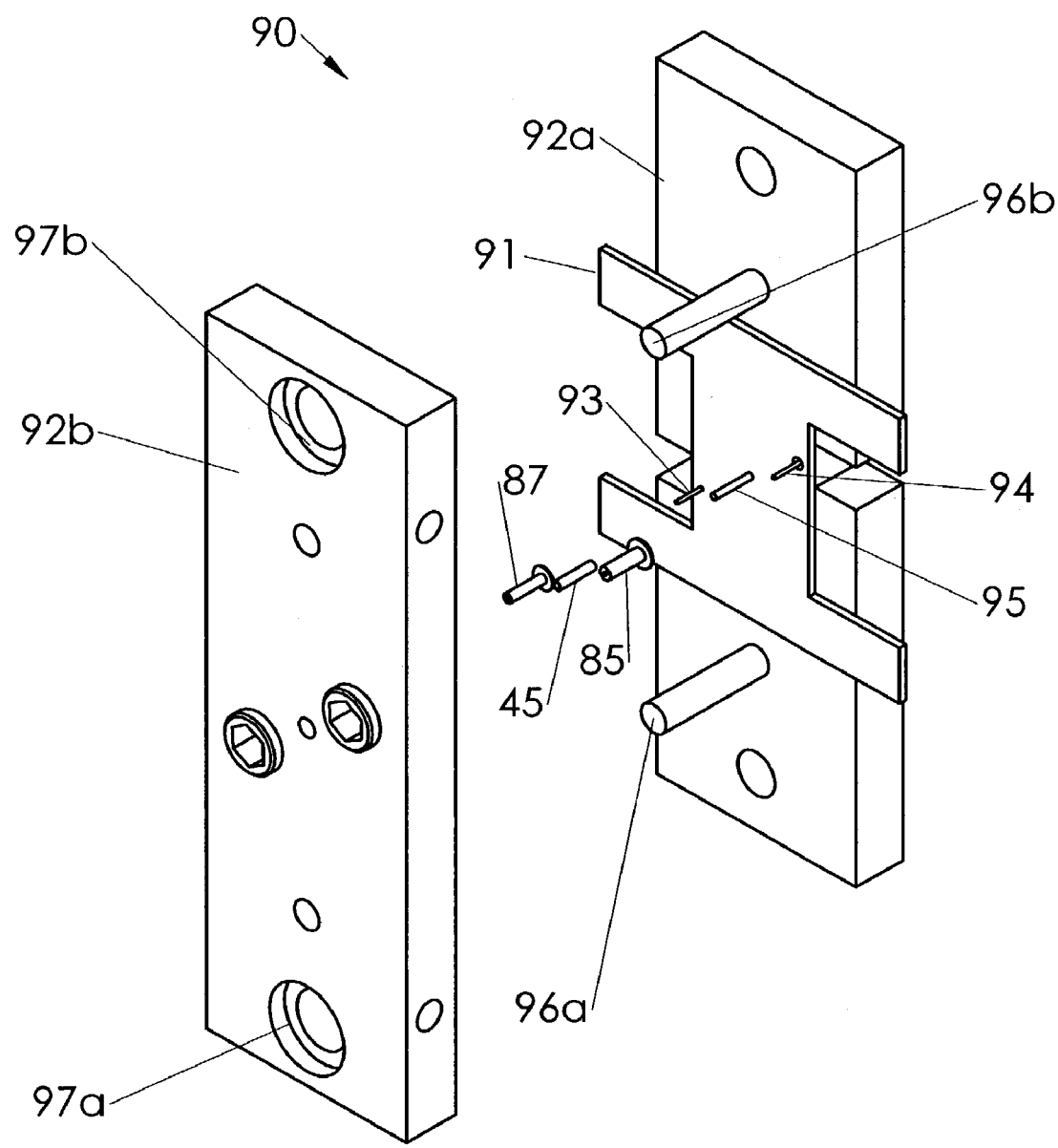
FIGS. 9–14 illustrate a method for forming the battery stack of an embodiment of the present invention.

As shown in FIG. 9, the method for stacking begins with a stacking fixture 90. A stacking plate 91 is mounted on a stacking base 92a. (The stacking plate 91 is used in a later step to facilitate the removal of the finished stack from the fixture.) Negative tube 87 is mounted on a negative pin 93.

Positive tube 85 is mounted on a positive pin 94. Insulating tube 45 is mounted on a locator pin 95.

Figure 10:
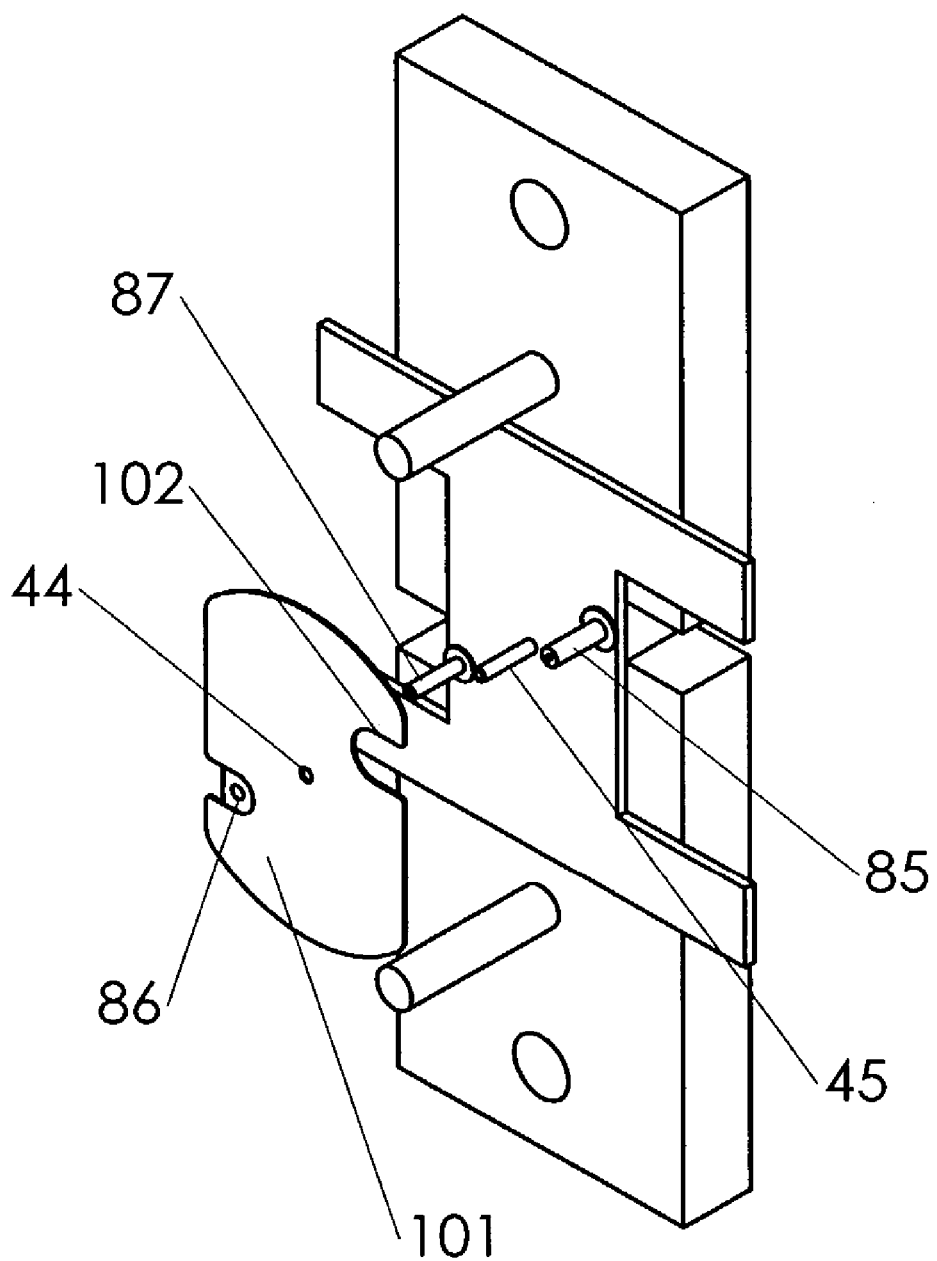

As shown in FIG. 10, a negative electrode having only one side of the substrate coated with active material, hereinafter known as a "one-sided negative electrode 101", is mounted with the uncoated side against the fixture such that the negative electrode locator hole 44 slides over the insulating tube 45 and the negative hole 86 slides over the negative tube 87. Stacking begins with a one-sided negative electrode because the negative electrode surrounds the positive electrode to avoid lithium plating. The negative electrodes are longer and wider than the positive electrodes and have smaller holes and cutouts to ensure that the negative electrodes surround the positive electrodes, as can be seen in FIG. 8A. The one-sided negative electrode 101 has a cutout 102 such that it avoids contact with the positive tube 85 and positive spacers 284. Each negative electrode has a cleaned area near the negative hole 86. The components are dimensioned preferably so that the straight edge of the cleaned area will lie tangent with the negative spacers 121 (shown in FIG. 12). The area is cleaned of active material so that the substrates of the electrodes come into contact with the spacers and so that the active material does not contaminate the stack weld.

Figure 11:
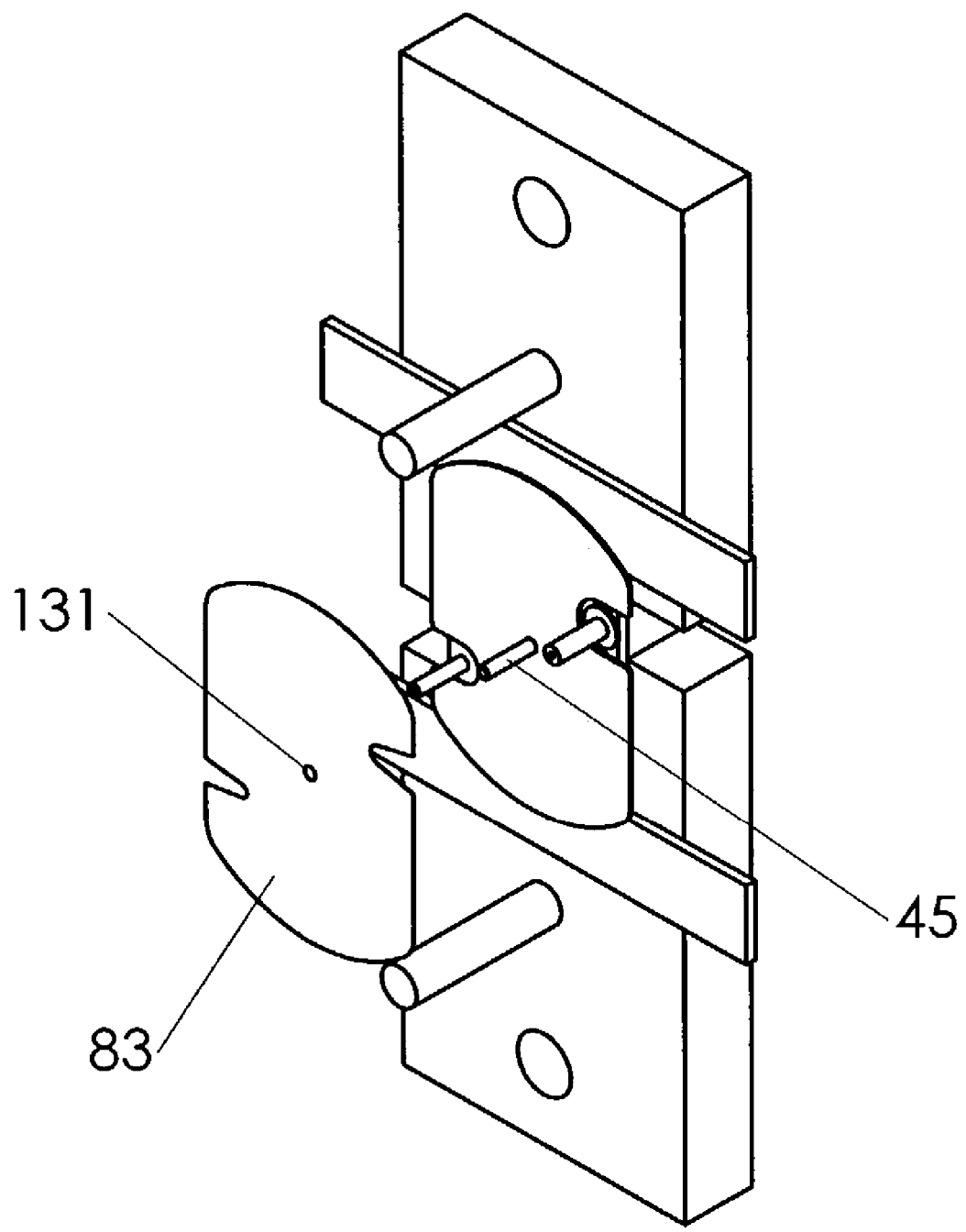

As shown in FIG. 11, a sheet of separator 83 is mounted on the stack such that the separator locator hole 131 engages the insulating tube 45 and the cutouts wrap around the positive and negative tubes.

Figure 12:
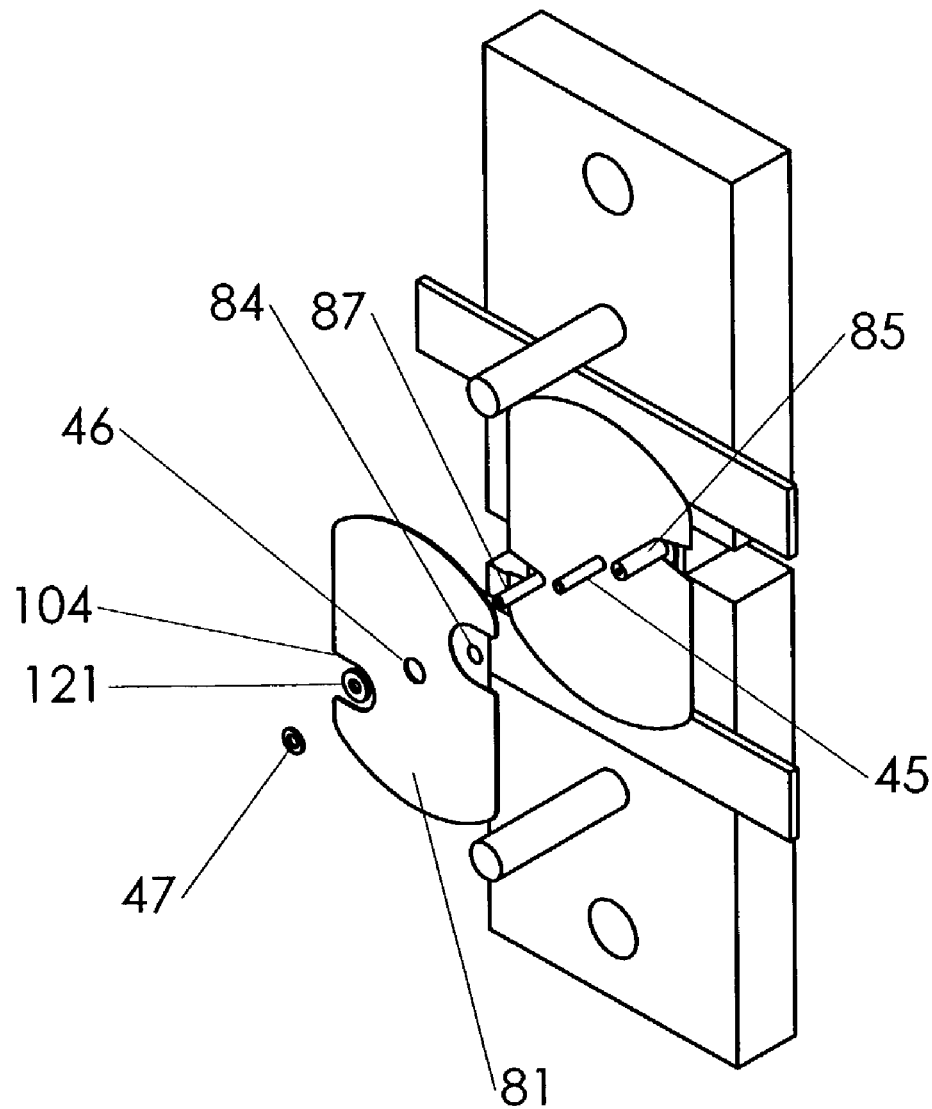

As shown in FIG. 12, a negative spacer 121, which preferably is made from the same material as the negative electrode substrate, is mounted on the negative tube 87. An insulating spacer 47 is mounted on the insulating tube 45. A positive electrode 81 is mounted on the stack such that the positive electrode locator hole 46 engages the insulating spacer 47 and the positive hole 84 engages the positive tube 85. The positive electrode 81 has a cleaned area near the positive hole 84. The components are dimensioned preferably so that the straight edge of the cleaned area will lie tangent with the positive spacers. The area is cleaned of active material so that the substrates of the electrodes come into contact with the spacers and so that the active material does not contaminate the stack weld. The positive electrode 81 has a cutout 104 such that it avoids the negative tube 87 and spacers 121.

Figure 13:
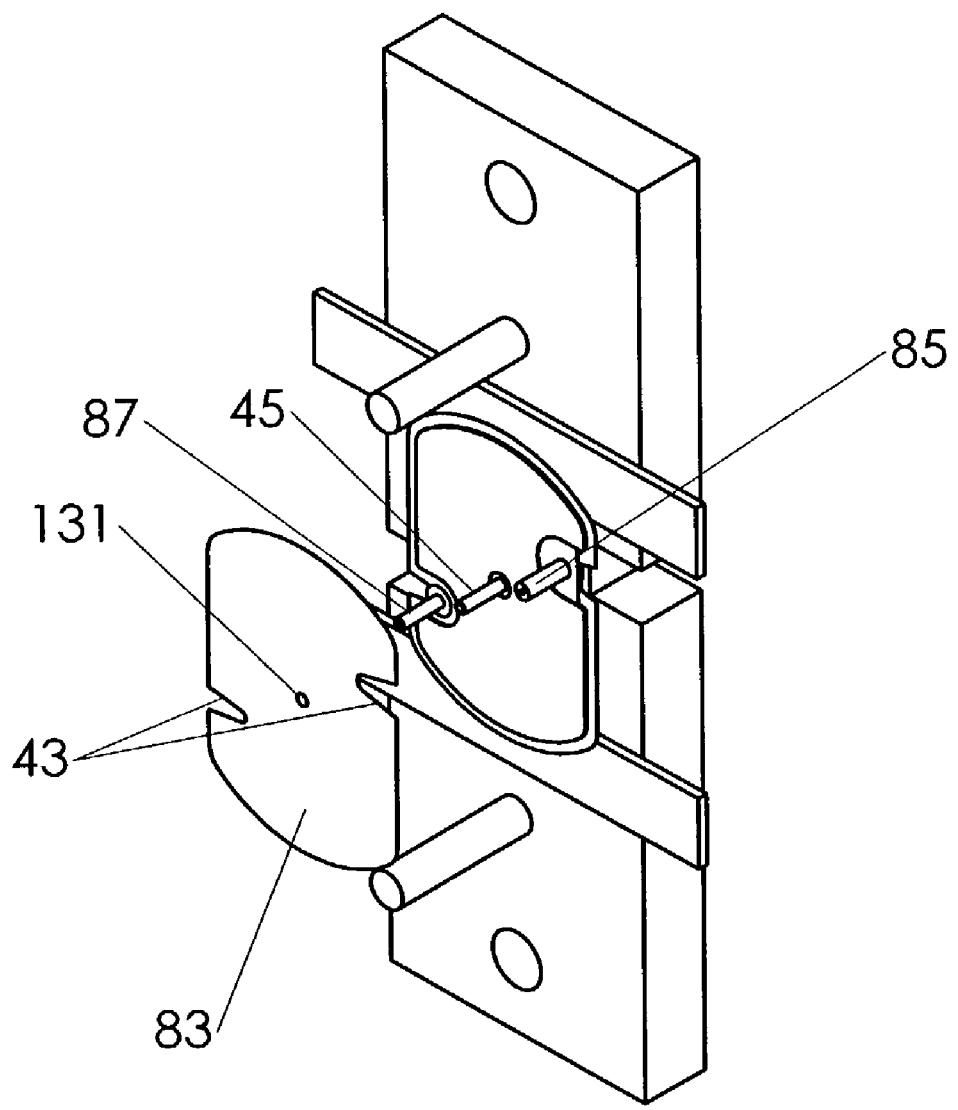

As shown in FIG. 13, a sheet of separator 83 is mounted on the stack such that a separator locator hole 131 engages the insulating tube 45 and the cutouts 43 wrap around the positive and negative tubes 85 and 87, respectively.

Figure 14:
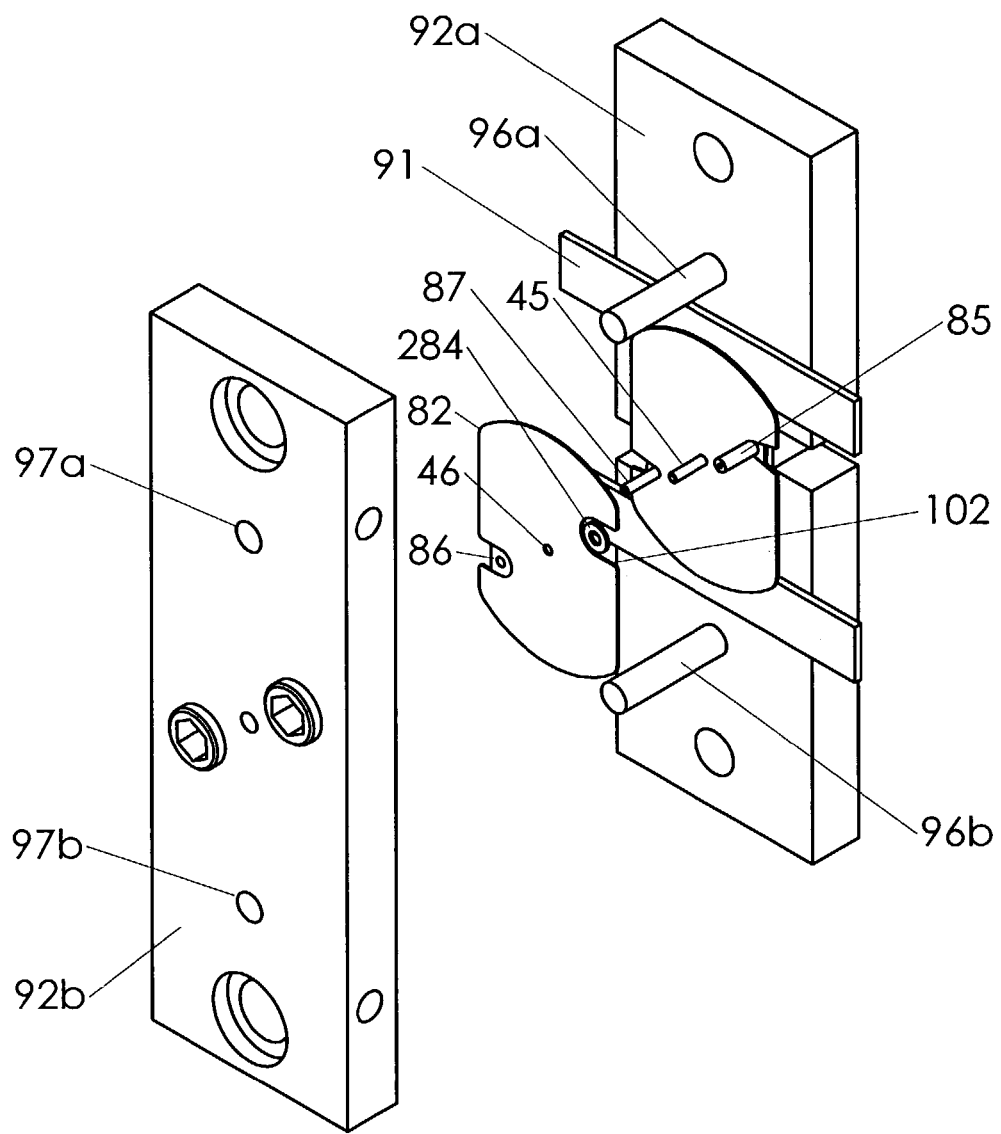

As shown in FIG. 14, a positive spacer 284, which preferably is made from the same material as the positive electrode substrate, is mounted on the positive tube 85. A two-sided negative electrode 82 is mounted such that the locator hole 46 slides over the insulating tube 45 and the negative hole 86 slides over the negative tube 87. The negative electrode 82 has a cutout 102 such that it avoids the positive tube 85 and spacers 284. The stacking continues in this fashion, repeating the actions illustrated in FIGS. 10 to 14, [negative electrode 82 (one-sided negative electrode 101 to start and finish)]-[separator 83]-[negative spacer 121]-[insulating spacer 47]-[positive electrode 81]-[separator 83]-[positive spacer 284]-[negative electrode 82]. It should be noted that because the elements between the sheets of separator are simultaneously mounted on the stacking fixture and are not layered, the order of the stacking is critical only for the elements between the separators. The positive spacer 284 and negative electrode 82 are mounted at the same time and then covered by a sheet of separator. Likewise, the negative spacer 121, insulating spacer 47, and positive electrode 81 are mounted at the same time and all covered by a sheet of separator 83. The stacking continues until all positive electrodes 81 have been stacked. Following the last positive electrode, a separator sheet 83 is mounted. Then, a final one-sided negative electrode 101 and negative spacer are mounted. This top electrode is mounted such that the coated side is facing down toward the stack. Depending on the application, any number of electrode layers may be used in this configuration; in certain medical applications, five to sixteen layers are preferred.

Figure 8E:
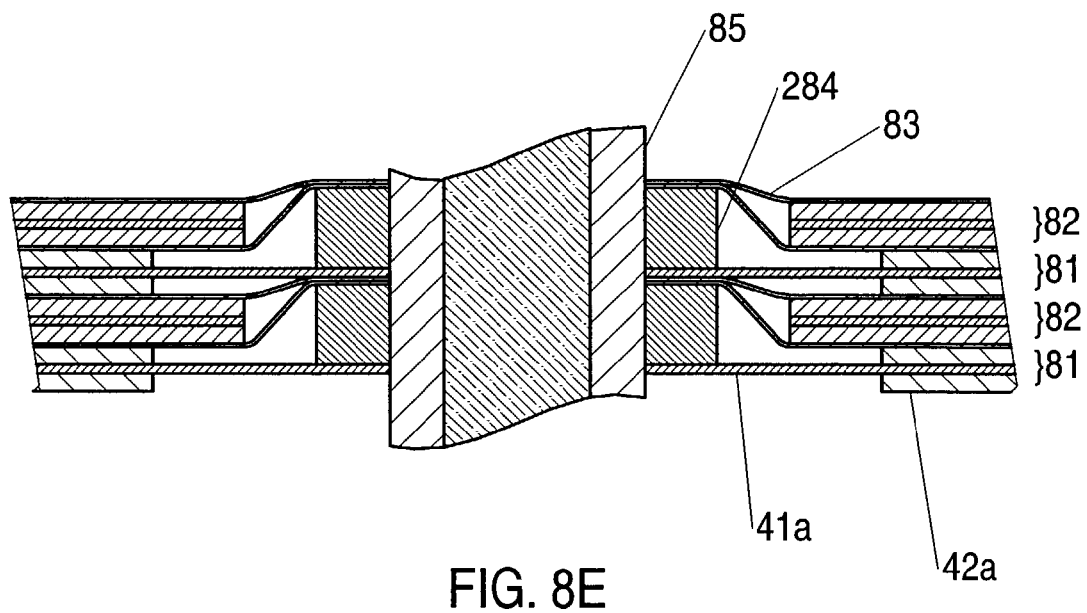
Figure 8F:
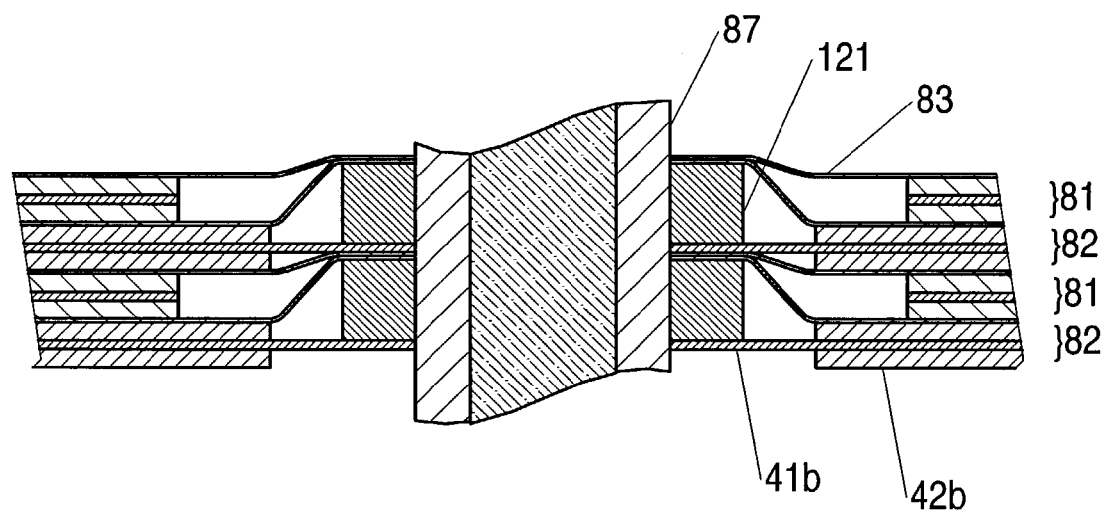

In an alternative embodiment shown in FIGS. 8B, 8E, and 8F, an alternative stacking order provides additional safety features while maintaining stacking efficiency. In this embodiment, the stacking order is: negative tube 87, negative single-sided electrode 101, negative spacer 121, positive tube 85, separator 83, positive electrode 81, positive spacer 284, insulating spacer 47, separator 83, negative double-sided electrode 82, negative spacer 121, separator 83, repeating positive electrode through negative spacer, ending with single-sided negative electrode 101 and negative spacer 121. An advantage of this order is that the spacer and electrode of the same polarity are sandwiched between separator layers. Any errant rotation of the electrode during stacking or otherwise will maintain isolation from the opposite polarity spacers. The separator will maintain the separation. Another advantage is that the spacer face is in more direct contact with the exposed substrate. In the stacking order of FIG. 8A, the spacer is only in contact with a sector of the substrate not covered by the separator. Greater area in contact will ensure better electrical connection. This ordering still utilizes the volume of the spacer into the cutout volume of the opposite polarity electrode by deforming the separator. Because the separator is so thin, the separator easily deforms around the spacer and into the cutout volume of the electrode.

Returning to FIG. 14, once the stacking is completed, a face plate 92b is aligned and moved toward the base 92a and corresponding stacking plate 91. This sandwiches and compresses the assembled electrodes, and holds them in position so that welding or other means of interconnection can be easily performed. In one embodiment, the base 92a has one or more prongs 96a, 96b that may be inserted into corresponding openings 97a, 97b to further improve alignment.

Stacking Features

The electrode stacking method provides alignment of the electrodes. As mentioned above, preferably, the negative electrodes 82 are larger than the positive electrodes 81 by a margin of about 0.5 mm to prevent the lithium ions from plating out, which precludes the practice of aligning the positive electrode edges with the negative electrode edges to position the electrodes. This 0.5-mm border is maintained by the stability of the electrode alignment described below. The negative electrodes are positioned by two tubes and holes, namely the negative tube to the negative hole and locator tube to locator hole. The positive electrodes are positioned by two tubes and holes, namely the positive tube to the positive hole and locator tube to locator hole. Alternatively or additionally, the positive and negative tubes and holes may be noncircular to provide further alignment or to obviate the need for the separate locator tube and hole.

In order to maintain the 0.5-mm border at the locator hole, an insulating spacer is used. This insulating spacer engages the positive electrode at its locator hole and the locator tube. The electrodes are aligned initially by the tubes and subsequently by the feedthrough pins and locator pin. The feedthrough pins thus function as both the alignment anchors and as the current collectors. This design compactly provides terminal connections and alignment anchors. All the edges of the positive coated material are within the perimeter of the coated negative material.

Figure 28A:
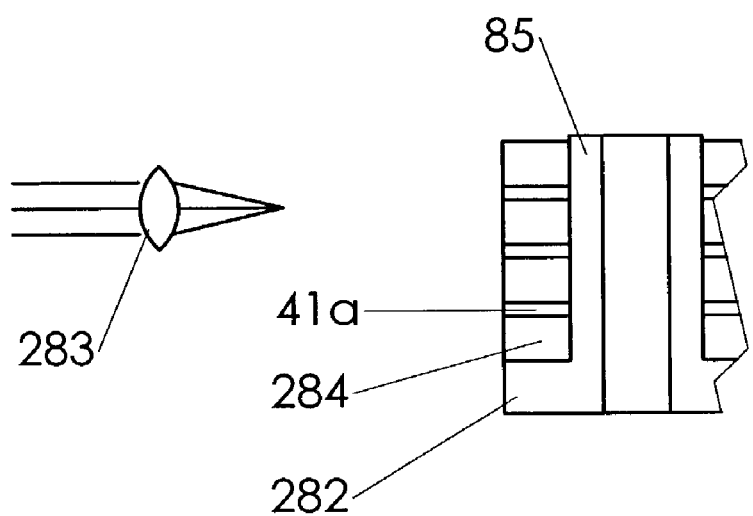
FIGS. 28A and 28B illustrate methods for connecting the spacers and electrode layers.

The stacking of electrodes provides mechanical attachment of the electrodes. The positive spacers 284 capture and connect the positive substrate 41*a* of the positive electrodes. Likewise, the negative spacers capture and connect the negative substrate of the negative electrodes. Preferably after stacking is complete, the positive spacers 284 are welded together and the negative spacers are welded together. Alternatively, the welding may take place in steps throughout the stacking process as one or more electrode layers are added to the stack. To weld, preferably, a laser 283 is directed at the edge of the stack of spacers and substrates, as shown in FIG. 28A, preferably in a low moisture, low oxygen environment. The laser welds thus produced serve as the mechanical and electrical connections for the electrodes. Alternatively, resistance welding or other attachment means known in the art may be used.

The positive and negative spacers are mechanical spacers. As seen in FIGS. 8C and 8E, the positive spacer 284 is designed to fit within the negative cutout and maintain the spacing between the positive electrodes; therefore, in the preferred embodiment, the positive spacer thickness is the thickness of the negative electrode plus the thickness of the positive electrode without its substrate Oust the active material on both sides of the substrate). The negative spacer is designed to fit within the positive cutout and maintain the spacing between the negative electrodes; therefore, in the preferred embodiment, the negative spacer thickness is the thickness of the positive electrode plus twice the thickness of the negative electrode without its substrate. The spacers maintain the spacing of the electrodes so that they are not deformed and remain substantially parallel to each other.

In another alternative, but not preferred, embodiment, instead of having one positive electrode between adjacent positive spacers and one negative electrode between adjacent negative spacers, there could be more than one positive electrode between adjacent positive spacers and more than one negative electrode between adjacent negative spacers; for example, three electrodes between adjacent spacers. In that case, the thickness of the spacers would be increased to compensate for the reduced number of spacers.

In another embodiment, the positive electrode, negative electrode, or both may comprise a structure other than a substrate with active material thereon. For example, the battery may be a primary battery with a lithium metal anode with or without a substrate. As another example, one or both electrodes may comprise a foamed metal impregnated with active material. In both of these examples, there would be no need to remove an active material layer from the surface of the electrode, and the thickness of the spacers would only be that of the opposite polarity electrode. To facilitate welding an electrode having a foamed metal substrate, active material may be removed from the region to be welded, such as by the method taught in U.S. Pat. No. 5,314,544 to Oweis, which is hereby incorporated by reference in its entirety. The region to be welded may be compressed to further facilitate welding; again, the spacers would be dimensioned accordingly, as can be appreciated by one of ordinary skill in the art.

The spacers provide the majority of the weld material. The substrates of the electrodes provide little material to weld together. Without the spacers, the substrates would be difficult to weld. Another method of attachment would be needed.

As shown in FIG. 28A, the positive tube 85 has a positive end feature 282 that has the same diameter as the positive spacer 284. Likewise, the negative tube has a negative end feature that has the same diameter as the negative spacer. These features allow the ends of the tubes to act as spacers and capture and connect the electrode substrates 41*a* together. During the welding, this positive end feature 282 of the positive tube 85 is welded to the positive electrode that is in direct contact with it as well as to the adjoining positive spacer, and the negative end feature of the negative tube is welded to the one-sided negative electrode that is in direct contact with it as well as to the adjoining negative spacer. Because the spacers and electrodes of each polarity are connected to each other, and the end features are connected to the adjoining electrode and spacer, the end features are thereby connected to all of the electrodes. The thickness of the end feature is preferably the same thickness or thinner than that of the standard spacer. An end feature with the thickness same as a spacer allows for a more substantial weld, but increases the overall stack thickness without increasing energy, thereby decreasing energy density. A thinner end feature allows for an overall thinner stack, but allows for a less substantial weld.

In an alternative embodiment, instead of assembling the spacers and electrode substrates on tubes 85 and 87 while on pins 95 and 93 of stacking fixture 90 (FIG. 9), the spacers and electrodes may be assembled directly onto the pins 95 and 93 of stacking fixture 90. This embodiment is beneficial because it removes the requirement for tubes and decreases the number of parts necessary to make the battery, thus decreasing costs.

In another alternative embodiment, the positive and negative tubes do not have to have an end feature as discussed earlier. Also, the first and last substrate layers do not have to be sandwiched between spacers. Instead, these layers can be connected to spacers by resistance or ultrasonic welding prior to stacking. Then, the spacer-electrode assembly can be stacked in the manner described above. This embodiment decreases the number of spacers necessary for the stack and also slightly decreases the stack height, yielding a slightly higher energy density.

Spacer-Electrode Connection

The tube-spacer-electrode scheme for connecting the layers of the battery together necessitates that the area of the electrode near the spacer be cleaned of active material, leaving essentially a metal substrate. This positive electrode substrate is preferably aluminum or stainless steel, and the negative electrode substrate is preferably titanium, copper, or stainless steel. The cleaned area of the electrode is preferably at least the area of the spacer, but an extra surrounding area also generally is cleaned. For example, a 0.25-mm border may be cleaned where the spacers would be placed on the negative electrodes, and a 1-mm border may be cleaned where the spacers would be placed on the positive electrodes.

Figure 15:
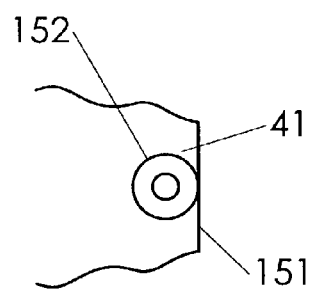
FIGS. 15–23 illustrate various embodiments of the spacer to substrate configuration.
Figure 16:
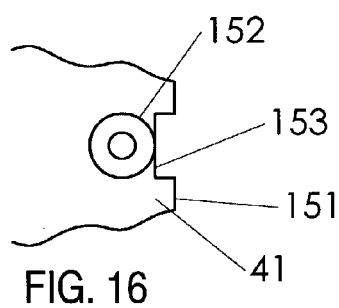

The rest of the configuration near the weld can vary to a large extent. As shown in FIG. 15, the preferred embodiment has the edge 151 of the substrate 41 tangent to the spacer edge 152. As shown in FIG. 16, the holes in the electrode may be positioned a greater distance from the edge than the radius of the spacers; in that case, a cutout 153 is provided near the spacers to accommodate this and allow for the substrate 41 to maintain tangency with the spacer edge 152.

Figure 20:
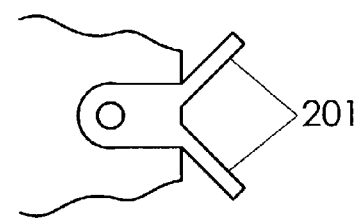
Figure 21A:
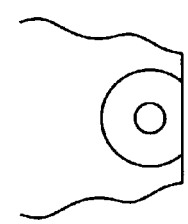
Figure 17:
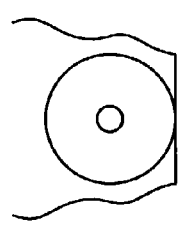
Figure 21B:
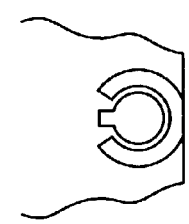
Figure 18:
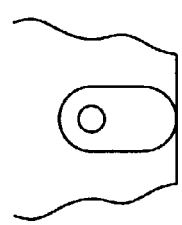
Figure 19:
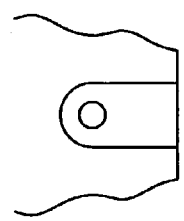

Alternatively, as shown in FIG. 17, the spacers may be larger in diameter; however, this decreases the capacity of the battery by wasting space due to the extended cleaned area and subsequent removal of active materials. As another alternative, as shown in FIGS. 18–20, the spacers may be a different shape, such as oval, rectangle, or unique shapes, for example, having protrusions 201 (FIG. 20) that help in protecting the separator from the weld. When laser welding, the laser beam and plume reflect with the reflected angle equal to the incident angle. Thus, it can be advantageous to have a flat surface to weld, such as those shown in FIGS. 19–21. A flat surface can be achieved simply by cutting a washer to have a flat surface on one side, as shown in FIG. 21A. However, round spacers are currently preferred for their radial symmetry, which eliminates alignment issues that are present for different shaped spacers. Also, round spacers are easier to manufacture, and thus cheaper. As an alternative, the C-shaped spacer with keyed tube or pin of FIG. 21B provides a flat surface for aligning with the electrode and welding, with a way of orienting the spacer. The spacer could be provided with other keyed shapes for orientation.

Figure 22:
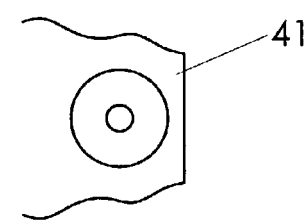
Figure 23:
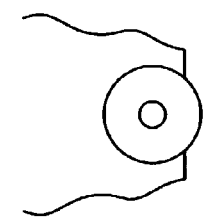

In preferred embodiments shown in FIGS. 15–21, the edge of the substrate is tangent to the spacer edge. Alternatively, as shown in FIG. 22, substrate 41 may overhang beyond the spacer, with the extra substrate providing more filler material for the weld. As another alternative weld configuration, shown in FIG. 23, the edge of the spacer sticks out from substrate 41 slightly so that it is not tangent to the edge. This may trap the laser beam in between the spacers, thus producing a better weld. Having more filler material is beneficial to avoid creating gaps between the spacers. Due to tolerances, tangency cannot be guaranteed. In a preferred embodiment the spacer is tangent to the substrate edge or is slightly recessed from it, as in FIG. 22.

Figure 24:
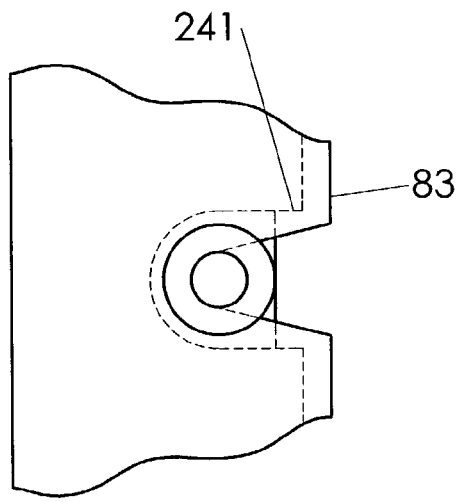
FIGS. 24–26 illustrate various embodiments of the separator of the present invention.
Figure 25:
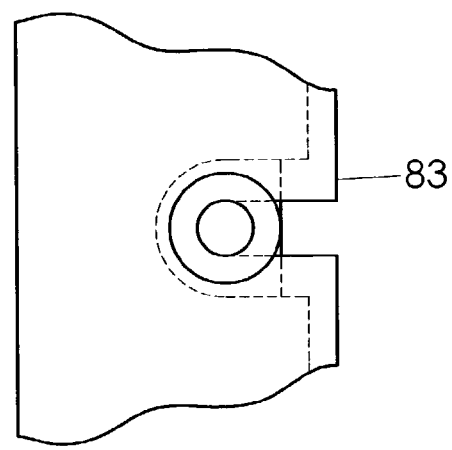
Figure 26:
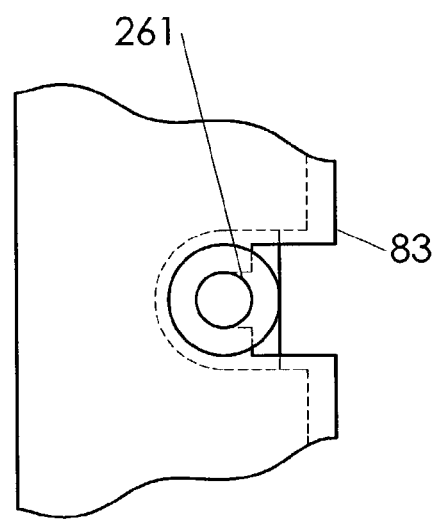

The separator of the battery is an interlayer between layers of positive and negative electrodes. In a preferred embodiment, the separator is captured between the positive spacers on one side and the negative spacers on the other, and is also aligned using a small hole where the separator slides onto the locator tube. Thus, the separator cannot translate or swivel. As shown in FIG. 24, the cutouts of the separator located where it slides near the tubes are preferably flared so that the exposed area of the spacers is maximized. The angle at which the separator flares is chosen such that the separator 83 covers the corners of the electrode 241 with an extra border of 0.5 mm. The flaring of the separator cutout enables more flexibility in determining the depth at which the spacers can be placed from the edge of the battery electrodes. As shown in FIG. 25, if the separator cutout were not flared, the gap would be much smaller, so that it would be much more difficult, if not impossible to perform the laser welds without damaging the separator 83. In another preferred embodiment, shown in FIG. 26, the separator 83 has a cutout that allows a wider gap to the depth of the tube, where there is a notch 261 that locates the separator on the tube.

Figure 27:
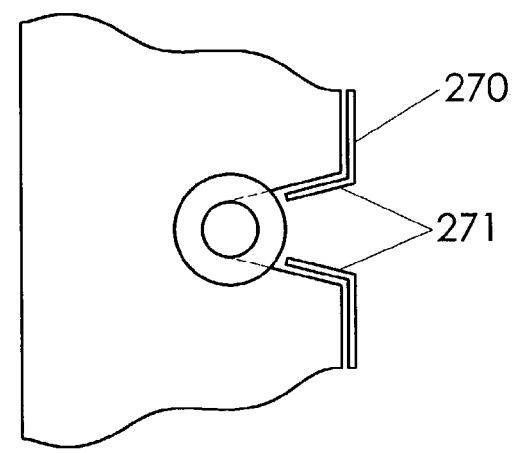
FIG. 27 illustrates a shield as used to protect the electrodes and separator during welding.

As shown in FIG. 27, a shield 270 is used to cover the electrodes and separator as much as possible to prevent the weld energy from burning the edges of the separator. Directing the laser beam very near to the center of the gap between the spacer and substrate and using a shield to protect the layers of the battery avoids reflections of the laser beam onto the separator or electrodes of the battery. The shield is preferably made of metal and has very thin appendages 271 designed with the same angling as the flared cutout of the separator. The shields for the negative and positive connections are different according to the geometry and dimensions of each side. The appendages 271 span from above the stacked battery to the spacers, and are at least 0.10 mm away from the separator. If the shield were to touch the separator, it could melt it from the heat generated by the laser conducted through the shield. In addition to protecting the separator from any damage such as burning or melting, the shield helps to protect the stack from foreign particles, which may be from the plume generated by the laser.

Figure 28B:
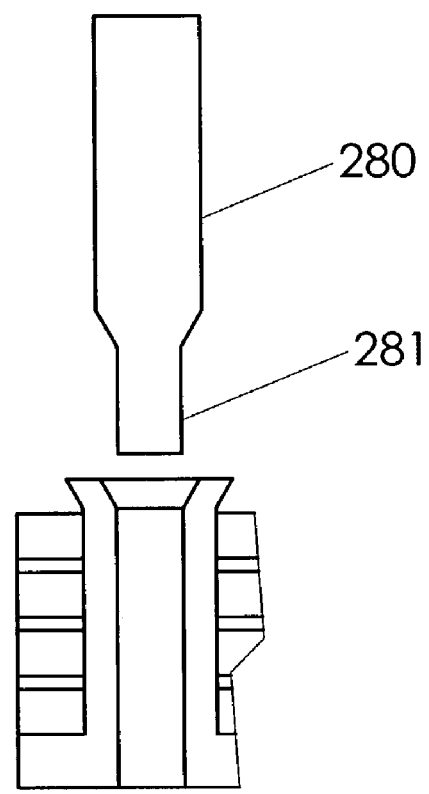

As shown in FIG. 28B, the top of the tube may be swaged over the top spacer to strengthen the connection of the spacer and electrode layers. Swaging is preferably performed prior to laser welding the stack, but may be performed instead of the laser welding. A swaging tool 280 has a special tip 281 to deform the top of the tube, pushing it out over the top spacer. This keeps the stack together mechanically. With the top of the tube pushed out, the top spacer is held tightly on the tube. Also, extra tube material above the top spacer pushes down on the spacers, keeping them from coming off. This swaging process is very similar to riveting.

Tube-Feedthrough Pin Connection

Figure 29:
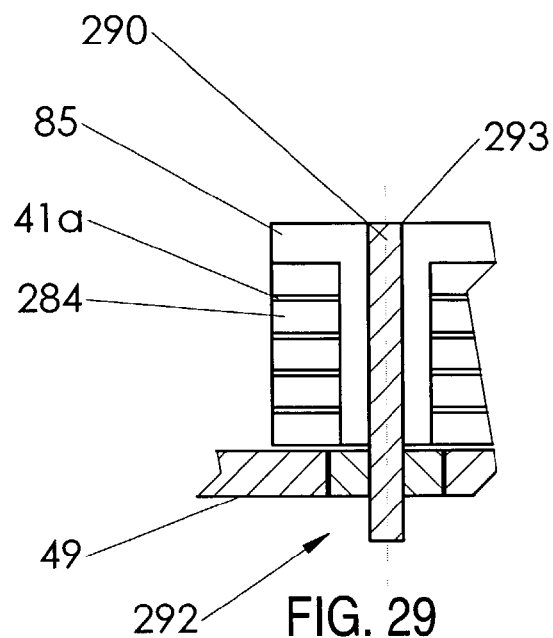
FIGS. 29–31 illustrate the length of the feedthrough pins for optimum weldability.
Figure 30:
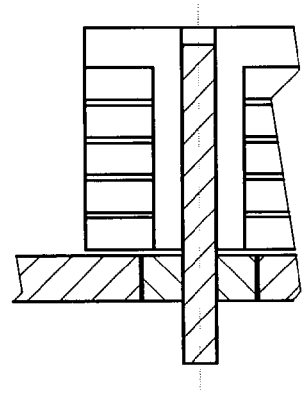
Figure 31:
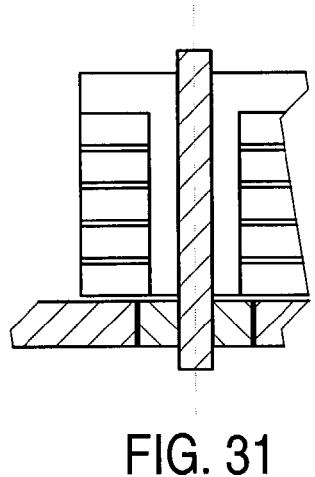
Figure 32:
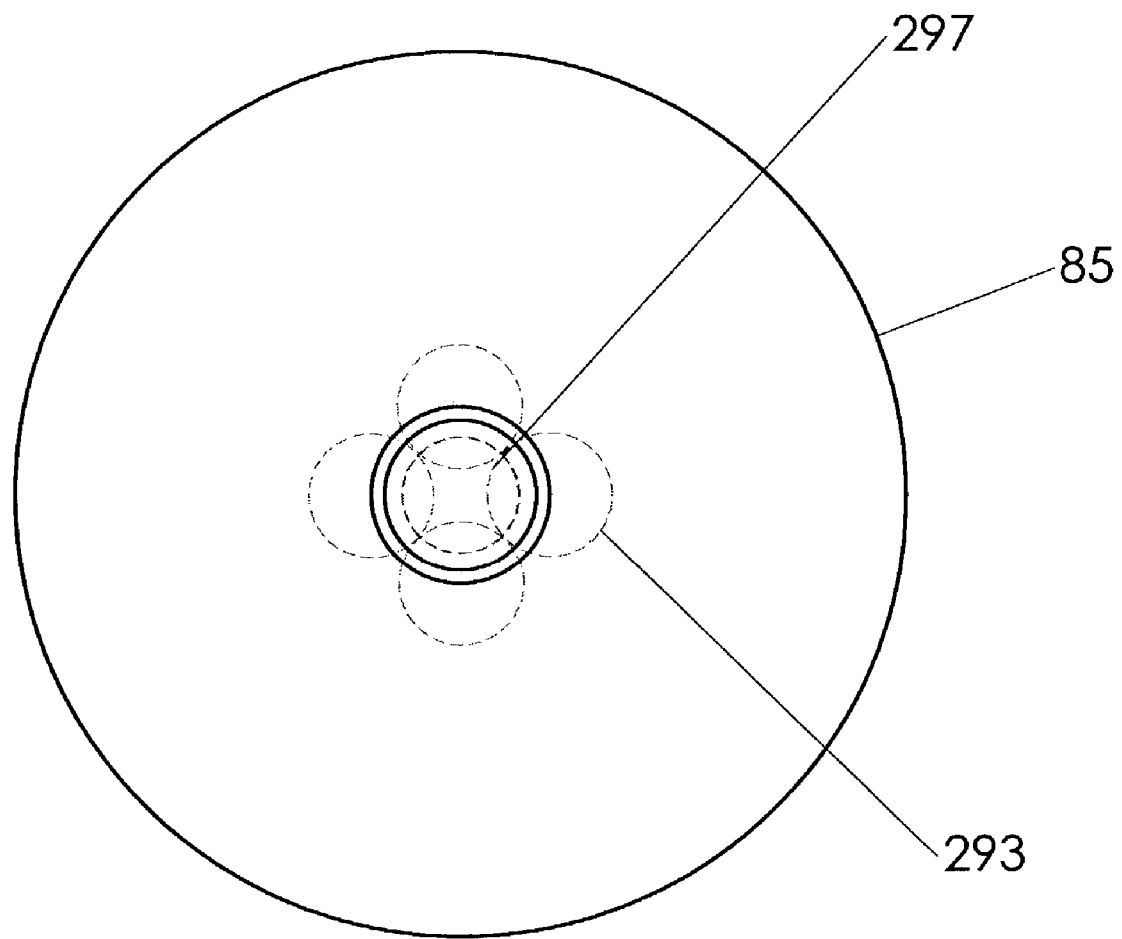
FIG. 32 illustrates the battery stacks placed on the covers for welding.

As described above, the electrodes are preferably laser welded to the corresponding spacers and tubes to form a battery stack. The tubes of the battery stack are slipped onto the feedthrough pins of the feedthroughs in the cover 49. As shown in FIGS. 29–31, laser welds 293 are used to connect the feedthrough pins to the ends of the tubes, as follows. As shown in FIG. 29, the positive feedthrough pin 290 is approximately the same length as the positive tube 85 or up to 1 mm longer (FIG. 31). A pin that is too long can create a lot of splatter of the weld. A fixture is used to cover the electrodes to protect them from splatter of welds. Preferably the feedthrough pin is not more than about 0.5 mm shorter than the tube (FIG. 30) to facilitate welding. As shown in FIG. 32, one or more laser welds 293 are delivered to the positive feedthrough pin 297 and the positive tube 85. The laser welds 293 are made along the border between the feedthrough pin and the tube so that the laser melts together some of the tube material with the feedthrough pin material. Five welds 293 generally ensure a good weld between the tube and feedthrough pin materials. The negative feedthrough pin and negative tube are welded in the same way.

In an alternative embodiment, instead of assembling the spacers and electrode substrates on tubes 85 and 87 while on pins 95 and 93 of stacking fixture 90, the spacers and electrodes may be assembled directly onto the feedthrough pins. This embodiment eliminates the steps of welding the tubes to the stack and removing the tubes from the stacking fixture 90.

In another alternative embodiment that has elements of the previous two described, the spacers and electrodes are assembled and welded onto tubes, which are on the feedthrough pins instead of on stacking fixture pins 95 and 93. The feedthrough pins may be welded to the tubes before or after completion of the electrode assembly.

Neutral Case

The case of the battery is preferably neutral; therefore, any unintended contact of the feedthrough pin to the case will not cause a short circuit. The electrode stack is insulated on all sides, including top, bottom, and sides, making the battery safer.

Figure 33:
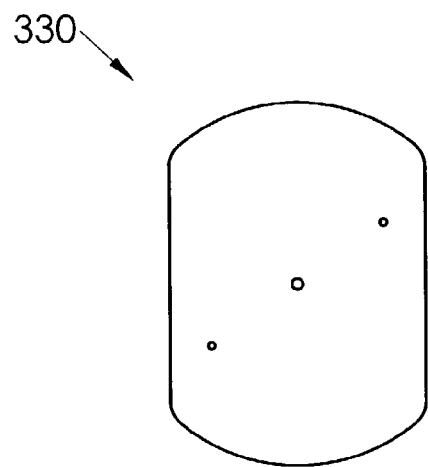
FIG. 33 is a plan view of the top insulator of an embodiment of the present invention.
Figure 34:
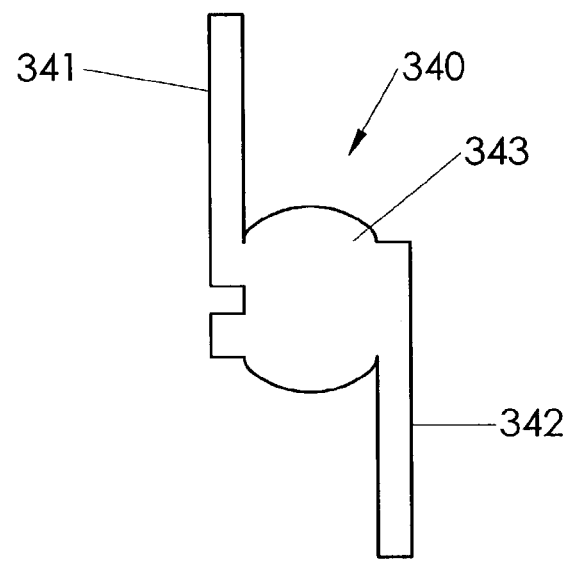
FIGS. 34–36 are plan views of three embodiments of the bottom and side insulators of the present invention.

As shown in FIGS. 33 and 34, in a first embodiment of the insulation, a top insulator 330 and bottom insulator 340 of Kapton® polyimide film, of thickness 0.001" to 0.005" insulates the stack. While this film is preferably as thin as possible for space considerations, about 0.002" is preferable for manufacturability. Top insulator 330 has three holes for the two feedthrough pins and the locator pin. Top insulator 330 is mounted on the cover assembly over the feedthrough pins and locator pin. Then the stack is mounted on the pins. The pins are welded to the tube. After the tube of the stack is welded to the pins of the cover assembly, the stack can be inserted into the case.

The bottom insulator 340 is cut such that it covers the bottom and sides of the case while leaving an opening around the fill hole 370. The bottom insulator may be cut in different shapes to achieve the same goal. In a first embodiment, the bottom insulator 340 has two flaps 341 and 342, one on each side of a center portion 343, which are folded such that the center portion 343 covers the bottom of the case and the flaps cover the side walls of the case and curve around the ends of the case. The cutout exposes the fill hole 370. The cutout edges preferably maintain a 0.5-mm border from the edge of the fill hole 370 to keep the electrolyte from being pulled into the seal location due to capillary action, contaminating it and disrupting final laser weld sealing.

Figure 35:
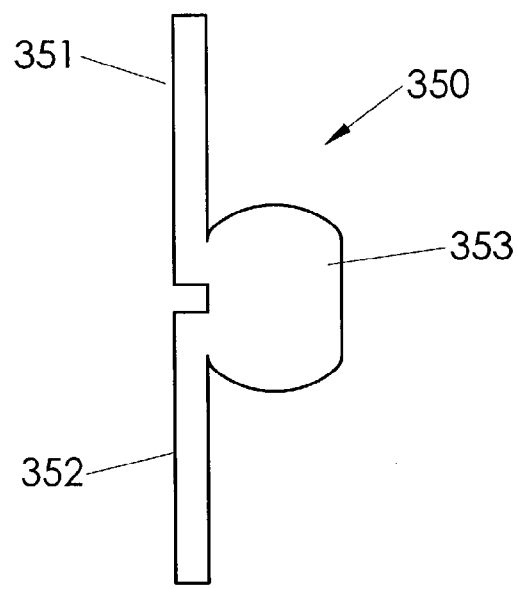

As shown in FIG. 35, in a second embodiment of the insulation, the bottom insulator 350 has two flaps 351 and 352 on one side of a center portion 353 that are folded such that the center portion 353 covers the bottom of the case and the two flaps cover the side walls of the case and curve around the ends of the case and overlap along the other straight side wall. The cutout exposes the fill hole 370. Again, the cutout edges preferably are at least 2 mm from the center of the fill hole 370 to keep the electrolyte from being pulled into the seal location, contaminating it and disrupting final laser weld sealing.

Figure 36:
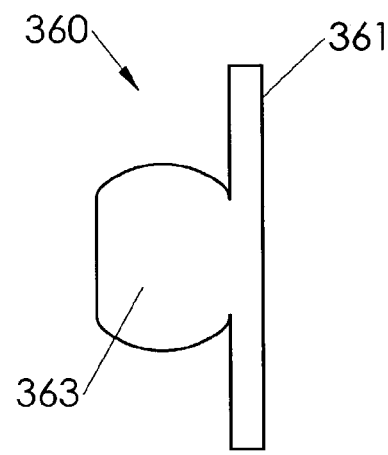

As shown in FIG. 36, in a third embodiment of the insulation, the bottom insulator 360 has one flap 361 on one side of a center portion 363 folded such that the center portion 363 covers the bottom of the case and the flap covers the side wall and curves around the ends of the case. The flaps end such that an opening is left for the fill hole. Again, the cutout edges preferably are at least 2 mm from the center of the fill hole 370 to keep the electrolyte from being pulled into the seal location, contaminating it and disrupting final laser weld sealing.

The cover assembly with the stack is inserted into the case with the bottom insulator covering the bottom and sides of the case. The case is laser welded to the cover. The electrodes are held stationary by the tube and pin welds. The bottom insulator insulates the sides of the case from contact with any electrodes that may inadvertently break free from the stack.

Another embodiment that provides a neutral case is a parylene-coated case, cover, and fill plug. Parylene is a generic name for a unique series of polymers based on paraxylene. Parylene has excellent properties for use in a battery. Parylene resists chemical attack and is insoluble in organic solvents. Parylene has a dielectric strength of 5000 volts/mil. Parylene can be coated via vapor deposition onto the underside of the cover and the side walls and bottom of the case and bottom side of the fill plug. The parylene can be coated on the order of 0.0005" thickness and achieve excellent electrical, mechanical, and chemical properties for the battery. The welded stack can be directly mounted onto the parylene-coated cover. The stack is then inserted into the parylene-coated case. Because the parylene obviates the need for the Kapton layers, more volume is available in which to add more electrode layers and hence, greater discharge capacity.

Filling

After the cover is welded to the case, the battery is filled with electrolyte through the fill hole 370 located on the side of the case 48, as shown in FIG. 8A. The side filling exposes the electrolyte to the edges of the stack through which the electrolyte is absorbed into the active materials on the electrodes. By introducing the electrolyte to the edges of the stack rather than to the flat surface of the top or bottom electrode, the electrolyte can easily fill all of the layers of the electrode stack, decreasing filling time. Alternatively, but not preferably, the fill hole may be located on the bottom of the case or the case cover.

Because filling requires space in the cell in which to inject the electrolyte for absorption into the electrode materials, replacing the polyimide sheet insulation with parylene assists in the electrolyte filling process by providing increased space for easier and faster filling.

After filling, a fill plug (not shown) is mounted and laser welded to seal the battery.

As an alternative to filling the battery with electrolyte through the fill hole 370, a solid polymer electrolyte may be interleaved between the positive and negative electrode layers. The stacked design of the present invention lends itself particularly well to use with a polymer electrolyte. Polymer electrolyte can be die cut to the desired shape, is flexible, and can be housed in a flexible bag without the danger of leaking.

The specific implementations disclosed above are by way of example and for enabling persons skilled in the art to implement the invention only. We have made every effort to describe all the embodiments we have foreseen. There may be embodiments that are unforeseeable and which are insubstantially different. We have further made every effort to describe the invention, including the best mode of practicing it. Furthermore, various aspects of the invention may be used in other applications than those for which they were specifically described herein. For example, the stacked electrode configuration having spacers for connections may be used in capacitors as well as batteries. Any omission of any variation of the invention disclosed is not intended to dedicate such variation to the public, and all unforeseen, insubstantial variations are intended to be covered by the claims appended hereto. Accordingly, the invention is not to be limited except by the appended claims and legal equivalents.

What is claimed is:

1. A battery, comprising:
   a battery case;
   positive and negative electrodes alternately stacked and isolated by separators and housed in the battery case,
      each of the positive electrodes having
         an active material positioned on a substrate such that the substrate has a positive exposed region on which the active material is not positioned,
         a positive hole extending through the substrate, and
      each of the negative electrodes having
         an active material positioned on a substrate such that the substrate has a negative exposed region on which the active material is not positioned,
         a negative hole extending through the substrate, and
   positive spacers stacked alternately with the positive electrodes such that a positive spacer is positioned between the positive exposed regions on different substrates, and negative spacers stacked alternately with the negative electrodes such that a negative spacer is positioned between the negative exposed regions on different substrates, wherein the positive spacers maintain predetermined spacing between the positive electrodes and wherein the negative spacers maintain predetermined spacing between the negative electrodes;

a positive current collector passing through the positive holes end electrically coupled to the positive electrodes via welding;

a negative current collector passing through the negative holes and electrically coupled to the negative electrodes via welding; and an electrolyte operatively associated with the electrodes.

2. The battery of claim 1, wherein the positive and negative current collectors extend through the battery case to form positive and negative battery terminals.

3. The battery of claim 1, wherein the positive and negative current collectors are coupled to positive and negative battery terminals.

4. The battery of claim 1, wherein the positive and negative current collectors and the positive and negative holes are noncircular.

5. The battery of claim 1, wherein the positive spacers include positive spacer holes aligned with the positive holes and wherein the positive current collector passes through the positive spacer holes and is electrically coupled to the positive spacers, and wherein the negative spacers include negative spacer holes aligned with the negative holes and wherein the negative current collector passes through the negative spacer holes and is electrically coupled to the negative spacers.

6. The battery of claim 5, wherein the positive spacers capture only one positive electrode between them and wherein the negative spacers capture only one negative electrode between them.

7. The battery of claim 5, wherein the positive spacers capture more than one positive electrode between them and wherein the negative spacers capture more than one negative electrode between them.

8. The battery of claim 5, wherein the spacers are noncircular.

9. The battery of claim 5, wherein the spacer holes are noncircular.

10. The battery of claim 5, wherein the positive spacer holes and the positive holes have the same diameter.

11. The battery of claim 1, wherein at least some of the spacers include at least one protrusion.

12. The battery of claim 1, wherein at least some of the spacers include a straight edge.

13. The battery of claim 1, further comprising:
a positive electrode cutout formed in each positive electrode, a negative electrode cutout formed in each negative electrode, and first and second separator cutouts formed in each of the separators, wherein the positive current collector passes through the negative cutouts and through the first separator cutouts, and wherein the negative current collector passes through the positive cutouts and through the second separator cutouts.

14. The battery of claim 13, wherein the cutouts of the separators are wider than the current collectors to facilitate welding.

15. The battery of claim 13, further comprising:
a positive tube surrounding the positive current collector and coupled to the positive current collector, and passing through the positive holes, negative cutouts, and first cutouts; and
a negative tube surrounding the negative current collector and coupled to the negative current collector, and passing through the negative holes, negative cutouts, and second cutouts.

16. The battery of claim 15, wherein the positive tube passes through the positive spacers and the negative tube passes through the negative spacers.

17. The battery of claim 16, wherein the positive spacers and the positive holes have at least a portion that is substantially to same shape and size as the positive current collector.

18. The battery of claim 16, wherein the negative spacers and the negative holes have at least a portion that is substantially the same shape and size as the negative current collector.

19. The battery of claim 15, wherein to positive and negative tubes help maintain alignment of the positive electrodes, negative electrodes, and separators.

20. The battery of claim 15, wherein at least one of the spacers is laser welded to a tube end feature.

21. The battery of claim 1, further comprising:
a locator hole in each of the positive electrodes, negative electrodes, and separators; and
a locator pin passing trough the locator holes.

22. The battery of claim 21, further comprising:
an insulating tube passing over the locator pin.

23. The battery of claim 22, wherein the insulating tube helps maintain alignment of the positive electrodes, negative electrodes, and separators.

24. The battery of claim 1, wherein:
each of the negative electrodes includes a negative substrate and negative active material;
each of the positive electrodes includes a positive substrate and positive active material;
each of the positive spacers is positioned in contact with and electrically coupled to at least one positive substrate; and
each of the negative spacers is positioned in contact with and electrically coupled to at least one negative substrate.

25. The battery of claim 24, wherein each of the spacers is positioned at an edge of the substrate.

26. The battery of claim 24, wherein each of the spacers is positioned at an edge of a cutout made in the substrate.

27. The battery of claim 24, wherein each of the spacers is inset from an edge of the substrate.

28. The battery of claim 24, wherein at least some of the spacers overlaps an edge of the substrate.

29. The battery of claim 24, wherein each of the spacers is laser welded to the substrate.

30. The battery of claim 1, wherein the negative electrodes have a larger surface area than the positive electrodes.

31. The battery of claim 1, wherein the positive and negative electrodes stacked alternately and isolated by separators are held together by laser welding.

32. The battery of claim 1, wherein the case is hermetically sealed.

33. The battery of claim 1, wherein the case includes a case cover having positive and negative terminals extending through the case cover.

34. The battery of claim 33, wherein the cover includes a locator pin extending through the cover.

35. The battery of claim 33, wherein:
the case includes a fill hole positioned on a side of the case.

36. The battery of claim 33, wherein the case is neutral.

37. The battery of claim 33, wherein the case includes a parylene coating.

38. The battery of claim 1, further comprising:
an insulator comprising a material chosen from the group consisting of: a polyimide film and PFA.

39. The battery of claim 38, wherein the insulator has a thickness of 0.001 to 0.005 inches (0.025 to 0.127 mm).

40. The battery of claim 1, further comprising:
an insulator having a pair of flaps and a center portion.

41. The battery of claim 40, wherein the center portion has at least two sides, the flaps being disposed one on each side of the center portion.

42. The battery of claim 40, wherein the center portion has at least one side, the pair of flaps being disposed on one aide of the center portion.

43. The battery of claim 40, the insulator includes a cutout.

44. The battery of claim 1, wherein the positive and negative electrodes exclude tabs.

45. A battery, comprising:
positive and negative electrodes alternately stacked and separated by separators, each of the positive electrodes having an active material positioned on a substrate such that the substrate having a positive exposed region on which the active material is not positioned, a positive hole extending through the substrate;
a positive spacer positioned between positive electrodes such that the positive spacer is between the positive exposed regions on different substrates;
a positive current collector passing through the positive holes and electrically coupled to the positive electrodes; and
an electrolyte operatively associated with the electrodes.

46. The battery of claim 45, wherein the positive electrodes exclude tabs.

47. A battery, comprising:
positive and negative electrodes alternately stacked and separated by separators, each of the negative electrodes having an active material positioned on a substrate such that the substrate has a negative exposed region on which the active material is not positioned, a negative hole extending through the substrate;
a negative spacer positioned between negative electrodes such that the negative spacer is between the negative exposed regions on different substrates;
a negative current collector passing through the negative holes and electrically coupled to the negative electrodes; and
an electrolyte operatively associated with the electrodes.

48. The battery of claim 1, wherein the negative electrodes exclude tabs.

49. The battery of claim 1, wherein the positive electrodes include positive exposed regions that surround the positive hole on each side of the substrate and a positive spacer is positioned between the positive exposed regions that surround positive holes extending through different substrates, and the negative electrodes include negative exposed regions that surround the negative hole on each side of the substrate and a negative spacer is positioned between the negative exposed regions that surround negative holes extending through different substrates.

50. The battery of claim 1, wherein a portion of one of the separators is positioned between a negative spacer and a negative electrode that is adjacent to that negative spacer, and
a portion of one of the separators is positioned between a positive spacer and the positive electrode that is adjacent to that positive spacer.

51. The battery of claim 1, wherein a portion of one of the separators is positioned between a negative spacer and a negative electrode such that the separator is in contact with both the negative spacer and the negative electrode, and a portion of one of the separators is positioned between a positive spacer and a positive electrode such that the separator is in contact with the positive spacer and the negative electrode.

52. The battery of claim 45, wherein the positive electrodes include a positive exposed region that surrounds the positive hole and the positive spacer is positioned between the positive exposed regions that surround positive holes extending through different substrates.

53. The battery of claim 52, wherein the positive electrodes include positive exposed regions that surround the positive hole on each side of the substrate.

54. The battery of claim 45, wherein a portion of one of the separators is positioned between a positive spacer and a positive electrode adjacent to the positive spacer.

55. The battery of claim 45, wherein a portion of one of the separators is positioned between the positive spacer and a positive electrode such that the separator is in contact with the positive spacer and the negative electrode.

56. The battery of claim 47, wherein the negative electrodes include a negative exposed region that surround the negative hole and the negative spacer is positioned between the negative exposed regions that surround negative holes extending through different substrates.

57. The battery of claim 56, wherein the negative electrodes include negative exposed regions that surround the negative hole on each side of the substrate.

58. The battery of claim 47, wherein a separator is partially positioned between the negative spacer and a negative electrode adjacent to the negative spacer.

59. The battery of claim 47, wherein a separator is partially positioned between a negative spacer and a negative electrode such that the separator is in contact with both the negative spacer and the negative electrode.

* * * * *